US010485383B2

(12) United States Patent
Worden, IV et al.

(10) Patent No.: US 10,485,383 B2
(45) Date of Patent: Nov. 26, 2019

(54) TENSION-MOUNTED POLE CADDY

(71) Applicant: Helen of Troy Limited, Belleville, St. Michael (BB)

(72) Inventors: Morris Elijah Worden, IV, New York, NY (US); Lingxiu Wu, Brooklyn, NY (US); Lynna A. Borden, Brooklyn, NY (US); Conor P. McNamara, Montclair, NJ (US); Martin Mutch, New York, NY (US)

(73) Assignee: Helen of Troy Limited, St. Michael (BB)

(*) Notice: Subject to any disclaimer, the term of this patent is extended or adjusted under 35 U.S.C. 154(b) by 0 days.

(21) Appl. No.: 15/834,308

(22) Filed: Dec. 7, 2017

(65) Prior Publication Data

US 2019/0174967 A1    Jun. 13, 2019

(51) Int. Cl.
*A47K 3/28* (2006.01)
*A47B 91/02* (2006.01)
(Continued)

(52) U.S. Cl.
CPC .............. *A47K 3/281* (2013.01); *A47B 45/00* (2013.01); *A47B 91/02* (2013.01); *F16B 7/14* (2013.01)

(58) Field of Classification Search
CPC .... A47K 3/281; A47B 45/00; A47B 96/1425; A47B 57/30; A47B 57/56; A47B 91/02; A47B 2001/105; F16B 7/14; F16B 7/105; B66F 3/04; B66F 3/06; B66F 3/02; E04F 21/1811; F16M 11/26; F16M 11/28; Y10T 74/1967; Y10T 74/1535; Y10T 292/0823; Y10T 292/0843; Y10T 292/28; Y10T 292/282; Y10T 292/285; Y10T 292/286;
(Continued)

(56) References Cited

U.S. PATENT DOCUMENTS 303,171 A * 8/1884 Long .................. A61G 5/12
297/423.3
387,345 A * 8/1888 Dickson .................. A47F 5/04
211/166
(Continued)

FOREIGN PATENT DOCUMENTS

CN    104692229    6/2015
DE    3239357    4/1984
(Continued)

OTHER PUBLICATIONS

International Search Report filed in PCT/US2018/061794 dated Feb. 4, 2019.

*Primary Examiner* — Ingrid M Weinhold
(74) *Attorney, Agent, or Firm* — Rankin, Hill & Clark LLP

(57) ABSTRACT

A tension-mounted pole for mounting between two substantially parallel surfaces includes a central tubular body, a first telescoping tubular body having a telescoping first end coupled with the central tubular body and a free second end, and a second tubular body having a telescoping first end coupled with the central tubular body and a free second end. An extension mechanism is mounted to the central tubular body. The extension mechanism is configured to be manually actuated and has a toothed rack and pinion arrangement configured to simultaneously move the first and second tubular bodies in opposite directions relative to the central tubular body.

16 Claims, 21 Drawing Sheets

(51) Int. Cl.
*F16B 7/14* (2006.01)
*A47B 45/00* (2006.01)

(58) Field of Classification Search
CPC ............ Y10T 292/289; Y10T 292/291; Y10T 292/297; Y10T 292/299; Y10T 292/301; Y10T 292/304; Y10T 292/306; Y10T 292/307; Y10T 292/34; Y10T 292/37; Y10T 292/373; Y10T 292/376; Y10T 292/379; Y10T 292/382; Y10T 292/385; Y10T 292/388; Y10T 292/391; Y10T 292/394; Y10T 292/397; Y10T 292/23; Y10S 292/37; E05C 17/54; E05C 19/003; E05C 19/004; E05C 19/18; E05C 19/188; E05C 9/04; E05C 9/041; E05C 9/12; E05C 9/1841; E05C 17/30
USPC ............ 248/200.1, 422, 404, 292.12, 354.1, 248/354.6, 354.7, 125.8, 161, 159, 218.4, 248/219.3, 188.8, 188.9; 410/145, 151, 410/143; 211/105.3, 107; 74/422, 109; 254/95, 97; 108/147.11, 147.12, 148
See application file for complete search history.

(56) References Cited

U.S. PATENT DOCUMENTS

| | | | | |
|---|---|---|---|---|
| 1,034,365 A * | 7/1912 | Hauser | ............... | A47B 57/56 248/246 |
| 1,347,862 A * | 7/1920 | Learmonth | ............... | B66F 3/04 254/95 |
| 1,833,781 A * | 11/1931 | Fuller | ............... | E21C 11/00 248/404 |
| 2,765,201 A * | 10/1956 | Phillips | ............... | B66F 3/04 182/141 |
| 3,064,934 A | 11/1962 | Desmarais | | |
| 3,774,872 A * | 11/1973 | Morelli | ............... | A47B 37/02 108/147 |
| 4,079,678 A * | 3/1978 | Champagne | ......... | A47B 57/545 108/106 |
| 4,621,783 A * | 11/1986 | Wier | ............... | A47B 57/56 174/163 F |
| 5,086,930 A * | 2/1992 | Saeks | ............... | B62H 3/12 211/17 |
| 5,104,269 A * | 4/1992 | Hardison | ............... | B61D 45/00 211/105.3 |
| 5,259,664 A | 11/1993 | Cottle | | |
| 5,666,888 A * | 9/1997 | Dame | ............... | A47B 9/06 108/143 |
| 6,152,434 A | 11/2000 | Gluck | | |
| 6,253,933 B1 * | 7/2001 | Yang | ............... | A47B 57/545 108/147.12 |
| 6,390,746 B1 | 5/2002 | Huang | | |
| 6,575,316 B2 * | 6/2003 | Lin | ............... | A47K 10/38 211/107 |
| 7,096,530 B2 | 8/2006 | Goulet | | |
| 8,807,534 B2 | 8/2014 | Guyard | | |
| 8,840,087 B2 | 9/2014 | Guyard | | |
| 9,943,192 B2 * | 4/2018 | Yang | ............... | F16B 7/105 |
| 2003/0173475 A1 * | 9/2003 | Hsieh | ............... | F16M 11/18 248/161 |
| 2004/0194418 A1 * | 10/2004 | Gouley | ............... | E04G 17/14 52/831 |
| 2004/0217239 A1 | 11/2004 | Chuang | | |
| 2007/0170406 A1 | 7/2007 | Li | | |
| 2010/0237032 A1 | 9/2010 | Whitehall et al. | | |
| 2010/0237209 A1 * | 9/2010 | Whittemore | ............... | B65H 49/26 248/218.4 |
| 2011/0242827 A1 * | 10/2011 | Farinola | ............... | A47F 5/00 362/368 |
| 2013/0093182 A1 | 4/2013 | Cordes et al. | | |
| 2013/0334156 A1 * | 12/2013 | Baines | ............... | A47B 55/00 211/134 |
| 2014/0145048 A1 * | 5/2014 | Kessell | ............... | A47B 57/26 248/218.4 |
| 2015/0257534 A1 * | 9/2015 | Yang | ............... | A47K 3/281 211/119.011 |
| 2017/0055780 A1 | 3/2017 | Jepson | | |

FOREIGN PATENT DOCUMENTS

| | | |
|---|---|---|
| FR | 2896136 | 7/2007 |
| GB | 219262 | 7/1924 |
| GB | 2323022 | 9/1998 |

* cited by examiner

TENSION-MOUNTED POLE CADDY

BACKGROUND

Tension-mounted pole caddies are popular supporting devices. Used vertically, they can support, for example, lighting fixtures, shelving units, and the like, while horizontal mounted poles are used for garment display, window coverings, shower curtains, and the like. Tension-mounted pole caddies can be erected and secured in a minimum of time with little mechanical ability, and are versatile because they can be located nearly anywhere, spanning the distance between two surfaces, like a floor and ceiling. It is the tension of the device, exerted between the surfaces, which provides the stability to maintain the pole in position.

Most basically, a typical tension-mounted pole caddy includes a first pole having a bottom foot to contact and grip a first lower surface with a smaller diameter second pole telescopically housed in and extending from the first pole. The second pole also has a foot which is intended to contact a second upper surface. The two poles are usually spring-biased outward relative to one another. One problem with such a design is that the device is either adjustable over a small span and/or the expansion force of the first and second poles can be damaging to the support surfaces.

In operation, the rubber foot on the lower/first pole of the spring-biased prior art device is placed on a desired lower surface (e.g., a floor). The user then pushes on the upper/second pole, against the force of the spring, to temporarily collapse and telescope the second pole into the first pole. With the second pole so held, the device is tilted into as near to a vertical orientation as possible. The second pole is then carefully released to allow the internal spring of the device to cause expansion until the rubber foot of the second pole contacts the upper surface (e.g., a ceiling).

As the telescoping second pole may be positioned above the middle of the pole caddy at a considerable height, short users may encounter considerable difficulty in attempting to orient the spring-biased device. Also, its strength of being held in a vertical position is directly dependent on the strength of the contained spring. Yet, the stronger the spring, which will hold the pole caddy in place, the more difficult the installation since to perform the installation the spring is first manually compressed until selectively released. Accordingly, another problem with the spring-biased design is that the installation is not always easy because the user must try to compress the two poles, against the strong outward bias of the spring, and, at the same time, try to place the pole into a vertical orientation.

SUMMARY

According to one aspect, a tension-mounted pole caddy for mounting between two substantially parallel surfaces comprises a central tubular body, a first telescoping tubular body having a telescoping first end coupled with the central tubular body and a free second end, and a second tubular body having a telescoping first end coupled with the central tubular body and a free second end. An extension mechanism is mounted to the central tubular body. The extension mechanism is configured to be manually actuated and has a toothed rack and pinion arrangement configured to simultaneously move the first and second tubular bodies in opposite directions relative to the central tubular body.

According to another aspect, a tension-mounted pole for mounting between two substantially parallel surfaces comprises a central tubular body, a first telescoping tubular body having a telescoping first end coupled with the central tubular body and a free second end, and a second tubular body having a telescoping first end coupled with the central tubular body and a free second end. A manually actuated extension mechanism is mounted to the central tubular body. The extension mechanism includes a first toothed rack and a second toothed rack, each provided in the central tubular body. The first toothed rack has a first end section and a second end section which is connected to the telescoping first end of the first tubular body. The second toothed rack has a first end section and a second end section which is connected to the telescoping first end of the second tubular body. The extension mechanism further includes a pinion gear in engagement with each of the first and second toothed racks. The pinion gear allows for simultaneous movement of the first and second tubular bodies in opposite directions relative to the central tubular body.

DETAILED DESCRIPTION

It should, of course, be understood that the description and drawings herein are merely illustrative and that various modifications and changes can be made in the structures disclosed without departing from the present disclosure.

Figure 1:
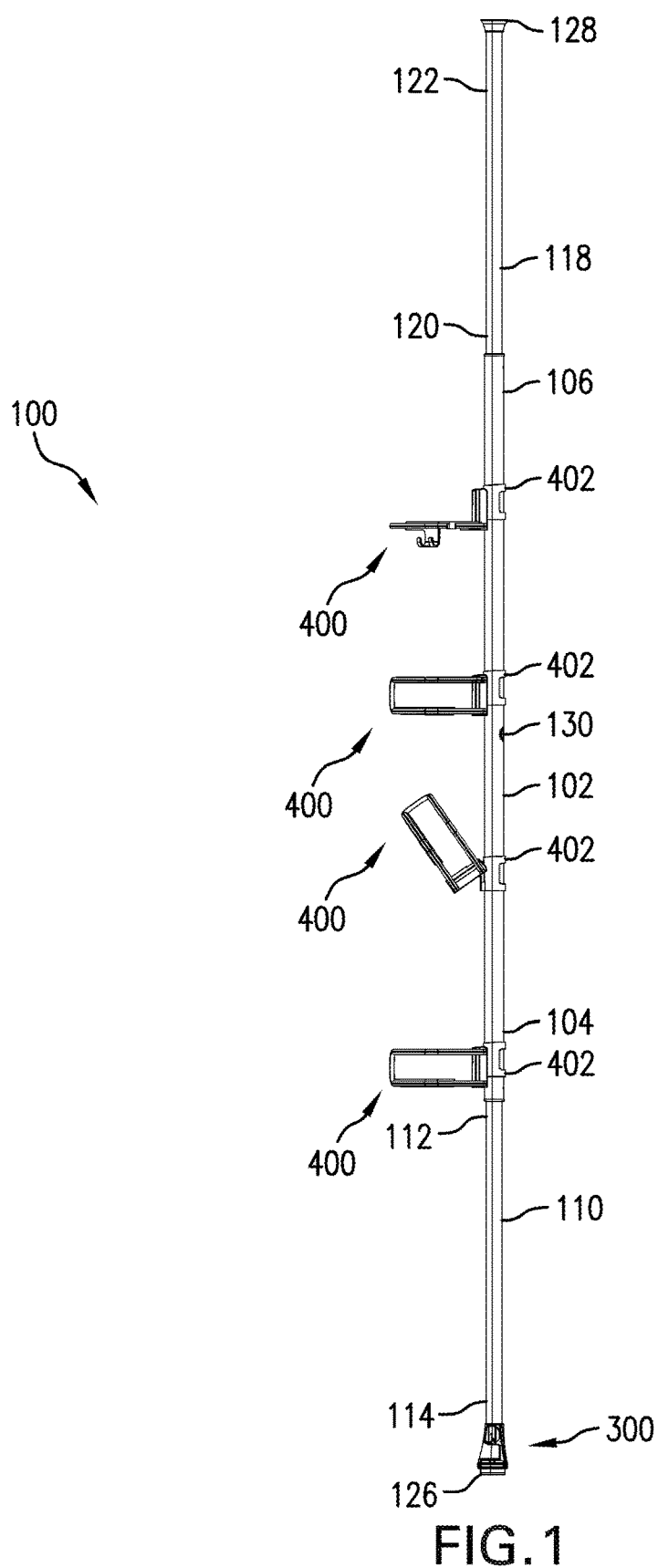
FIG. 1 is a perspective view of a tension-mounted pole caddy for mounting between two substantially parallel surfaces according to the present disclosure.
Figure 2:
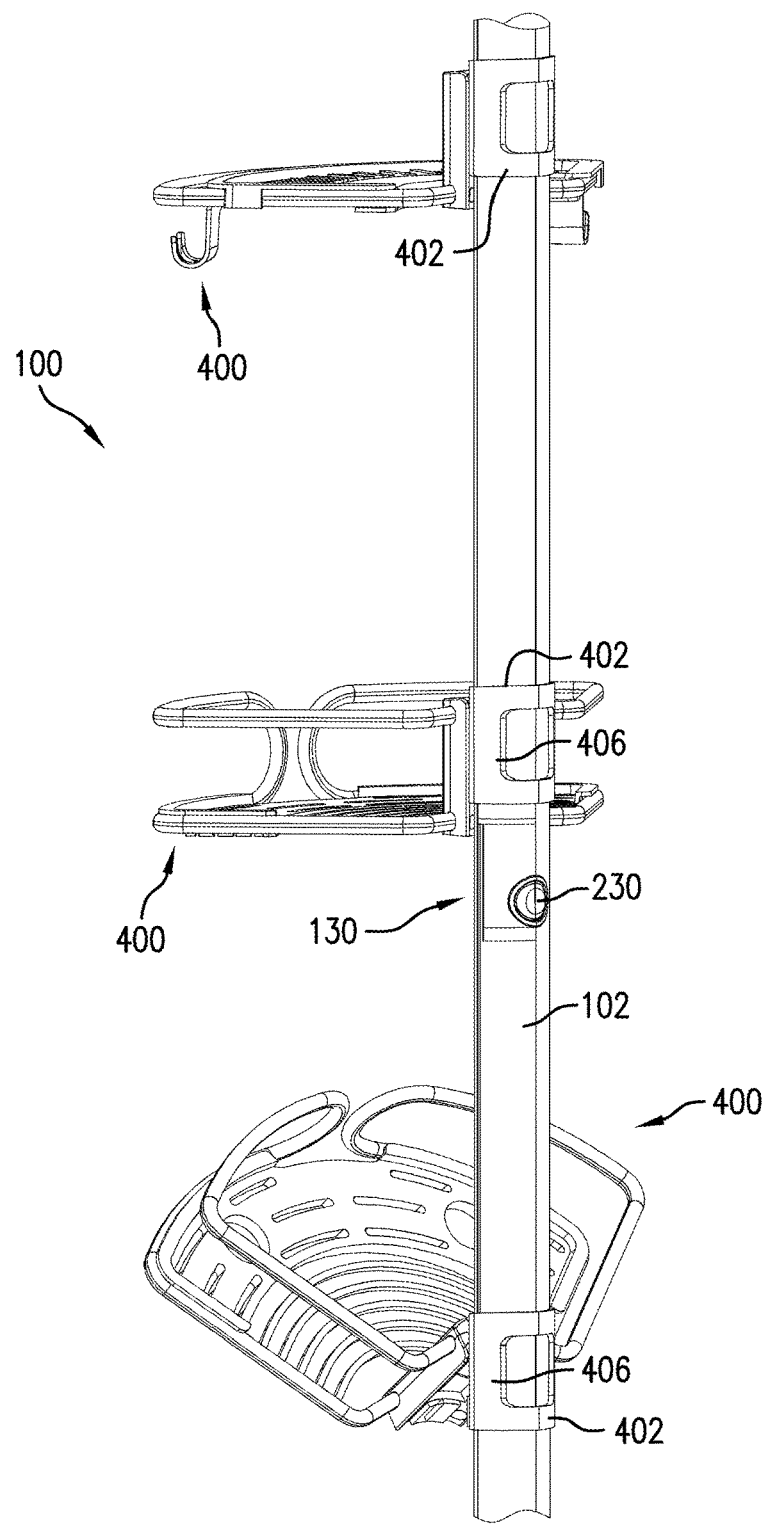
FIG. 2 is an enlarged perspective view of a section of the tension-mounted pole caddy having an exemplary extension mechanism according to one aspect of the present disclosure.
Figure 3:
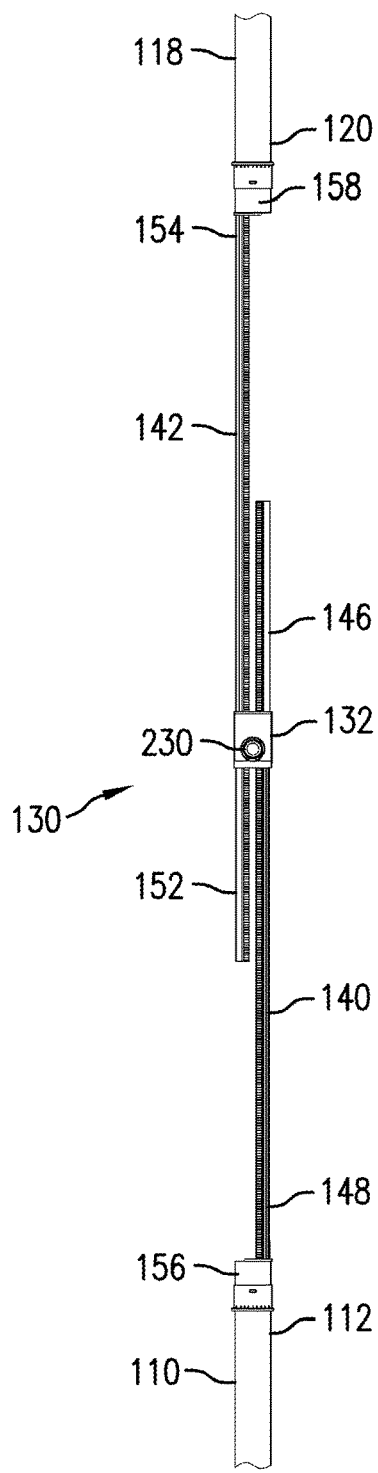
FIG. 3 is a perspective view of a toothed rack and pinion arrangement of the extension mechanism of FIG. 2.

Referring to FIGS. 1 and 2, there is illustrated an exemplary tension-mounted pole caddy according to the present disclosure, generally designated by the numeral 100. The pole caddy 100 is typically used as a decorative support for shelves, clothing, window dressings and such by mounting between two substantially parallel support surfaces using an outward tension at two surface contacting ends. The support surfaces may be oriented either horizontally, requiring a vertical support as, for example, in a bathroom shower stall, or vertically, requiring a horizontal support as, for example, in a closet or window box. The two support surfaces need not be exactly parallel, so long as the properly mounted pole caddy 100 is able to maintain its position when spanned between the two support surfaces.

Generally speaking, the exemplary tension-mounted pole caddy 100 comprises a central tubular body 102 having a first end 104 and a second end 106, a first telescoping tubular body 110 having a telescoping first end 112 coupled with the first end 104 of the central tubular body 102 and a free second end 114, and a second tubular body 118 having a telescoping first end 120 coupled with the second end 106 of the central tubular body 102 and a free second end 122. The first and second tubular bodies 110, 118 are telescoped to allow variation of the length/height of the pole caddy 100. The free second ends 114, 122 of the respective first and second tubular bodies 110, 118 can each be provided with a padded surface member or foot 126, 128 for contacting one of the support surfaces without marring that support surface in any way. A bottom area of each padded surface member 126, 128 can include a material such as rubber to provide the necessary grip and cushioning at the contacts between the free second ends 114, 122 and the support surfaces.

The exemplary pole caddy 100 further comprises an extension mechanism 130 mounted to the central tubular body 102 for adjusting and locking the span of the pole caddy. As will be described below, the extension mechanism 130 is configured to be manually actuated and has a toothed rack and pinion arrangement configured to simultaneously move the first and second tubular bodies 110, 118 relative to the central tubular body 102.

With reference to FIGS. 3-6, according to one aspect, the extension mechanism 130 includes a housing 132 mounted at least partially within the central tubular body 102. The housing 132 can be defined by a first housing part 136 and a second housing part 138 and is at least partially fitted over a first toothed rack 140 and a second toothed rack 142, each toothed rack being provided within the central tubular body 102. The first toothed rack 140 has a first end section 146 and a second end section 148 which is connected to the telescoping first end 112 of the first tubular body 110. Similarly, the second toothed rack 142 has a first end section 152 and a second end section 154 which is connected to the telescoping first end 120 of the second tubular body 118. To allow for the connection of each second end section 148, 154, connectors 156, 158 can be mounted to the respective second end sections 148, 154. The connectors 156, 158 can be received in and attached to the respective telescoping first ends 112, 120. According to one aspect, the first toothed rack 140 includes first teeth 160 and second teeth 162 separated from the first teeth via a separating wall 164 extending along a longitudinal extent of the first toothed rack 140. The first and second teeth 160, 162 are located on opposite sides of the wall 164. The second toothed rack 142 is similarly constructed and includes first teeth 170 and second teeth 172 separated from the first teeth via a separating wall 174 extending along a longitudinal extent of the second toothed rack 142. The first and second teeth 170, 172 are located on opposite sides of the wall 174. In the depicted embodiment, the first teeth 160, 170 of each of the first and second toothed racks 140, 142 have a first orientation and the second teeth 162, 172 have a second differing orientation. By way of example, in the illustrated embodiment, the first teeth 160, 170 are provided on the separating walls 164, 174 and the second teeth 162, 172 are provided transverse to the walls 164, 174. A pinion gear 178 is in engagement with each of the first and second toothed racks 140, 142, and more particularly, in engagement with the second teeth 162, 172 of each of the first and second toothed racks 140, 142.

Figure 4:
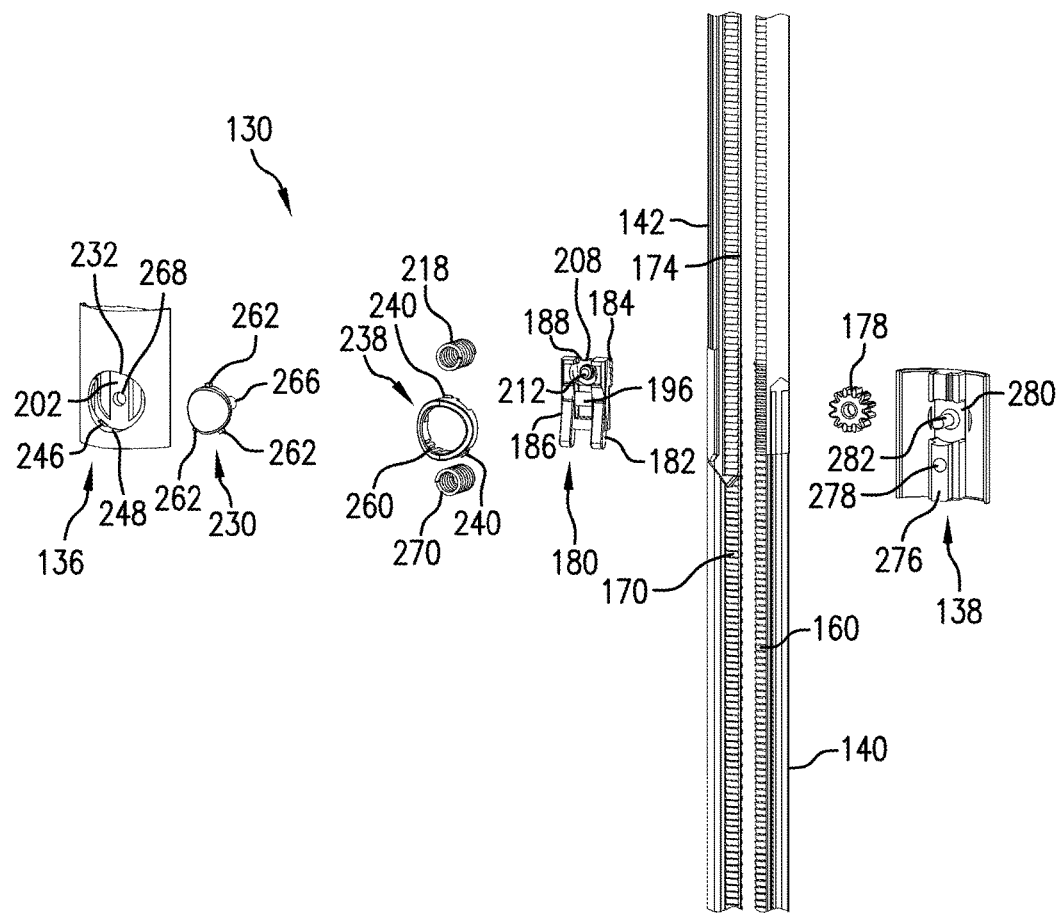
FIGS. 4 and 5 are exploded perspective views of the extension mechanism of FIG. 2.
Figure 5:
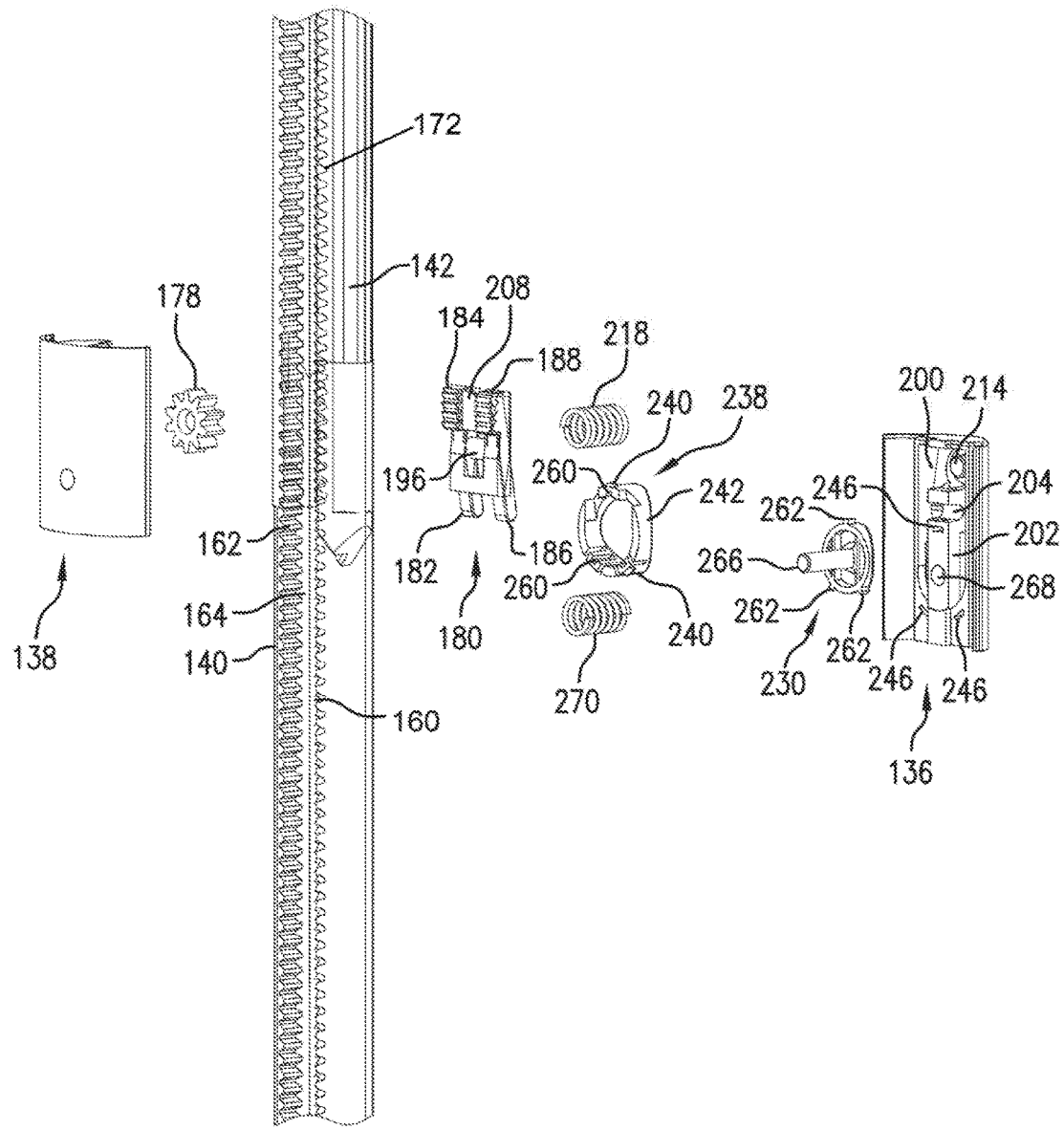
Figure 6:
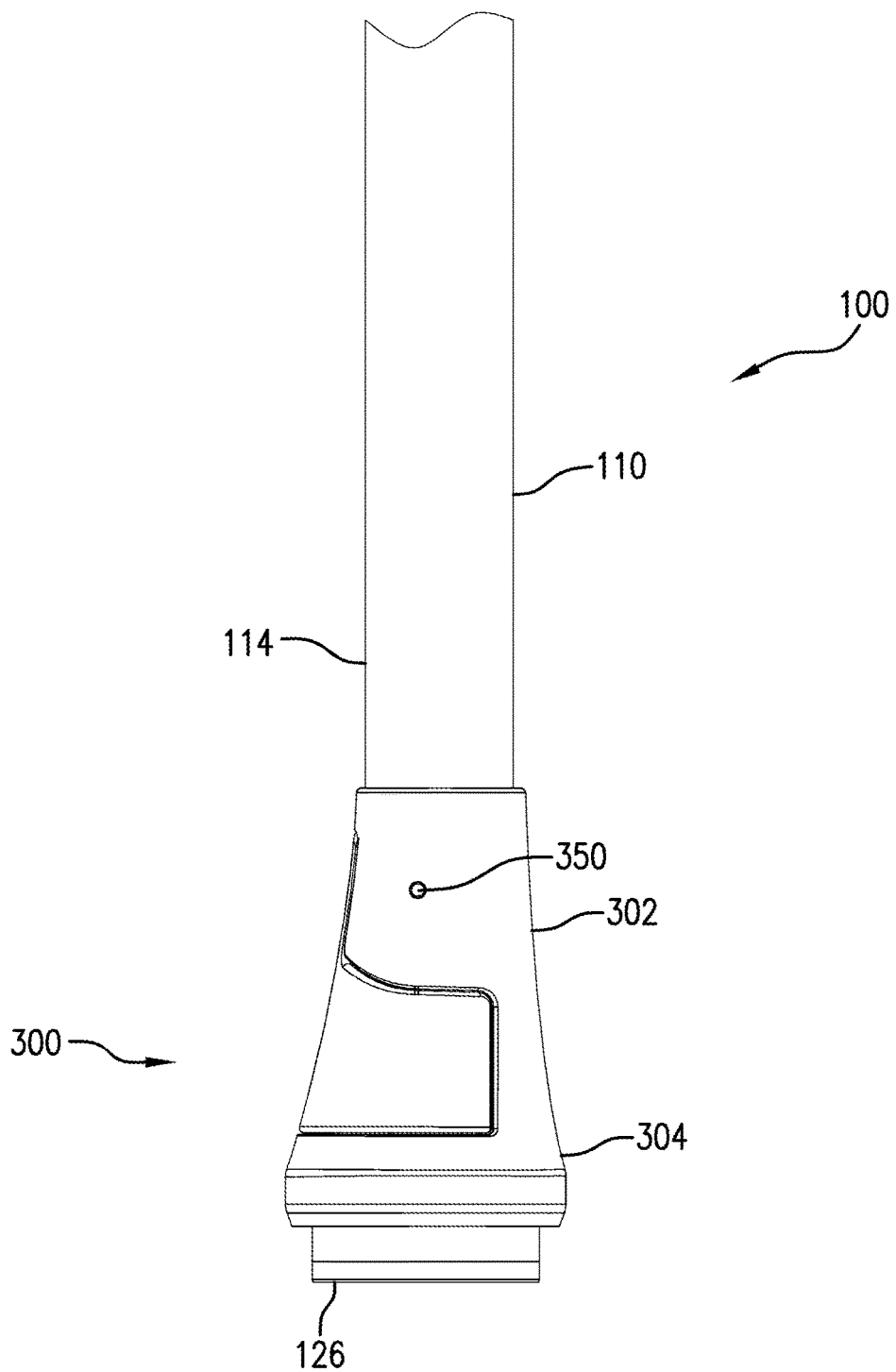
FIG. 6 is an enlarged perspective view of an exemplary extension foot assembly for the tension-mounted pole caddy according to one aspect of the present disclosure.
Figure 7:
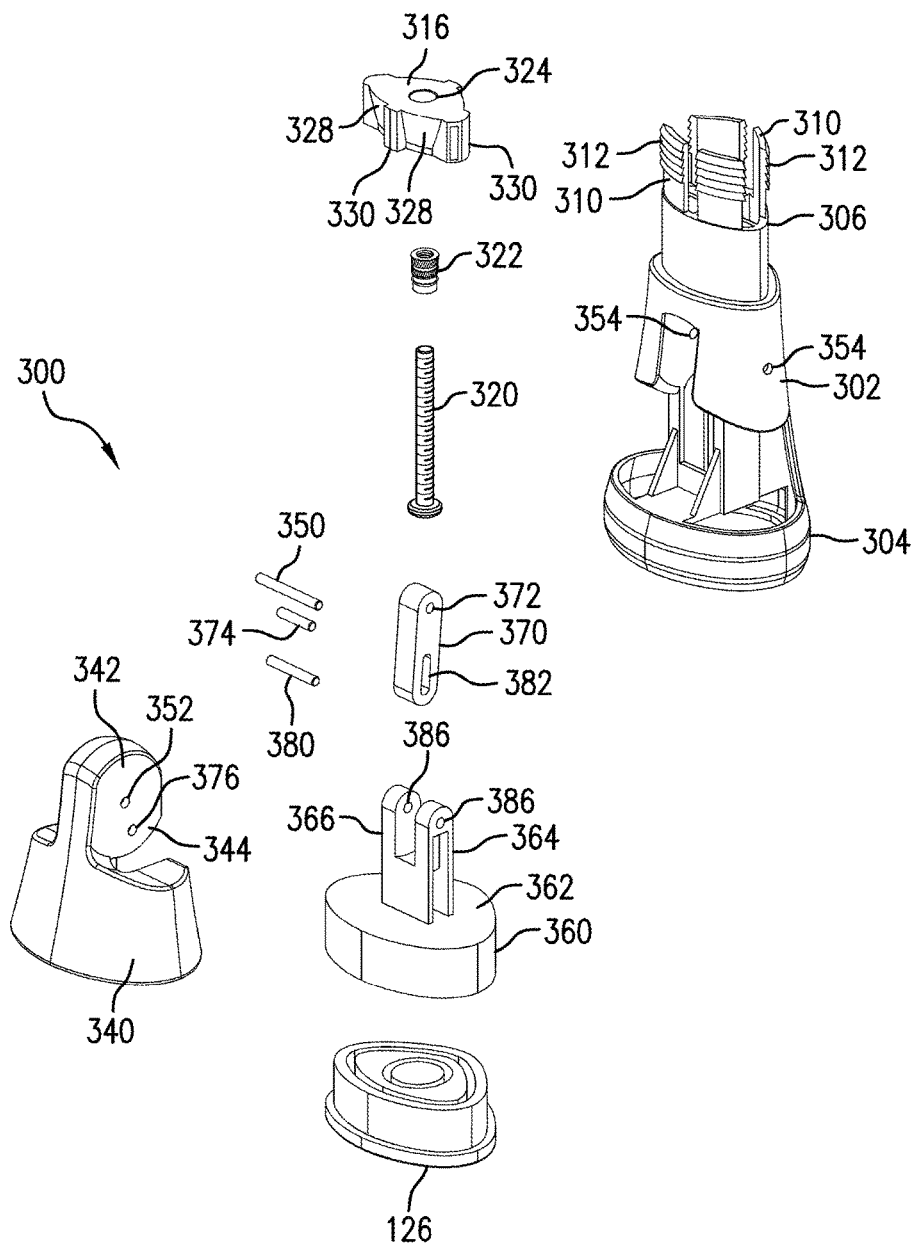
FIG. 7 is an exploded perspective view of the extension foot assembly of FIG. 6.
Figure 8:
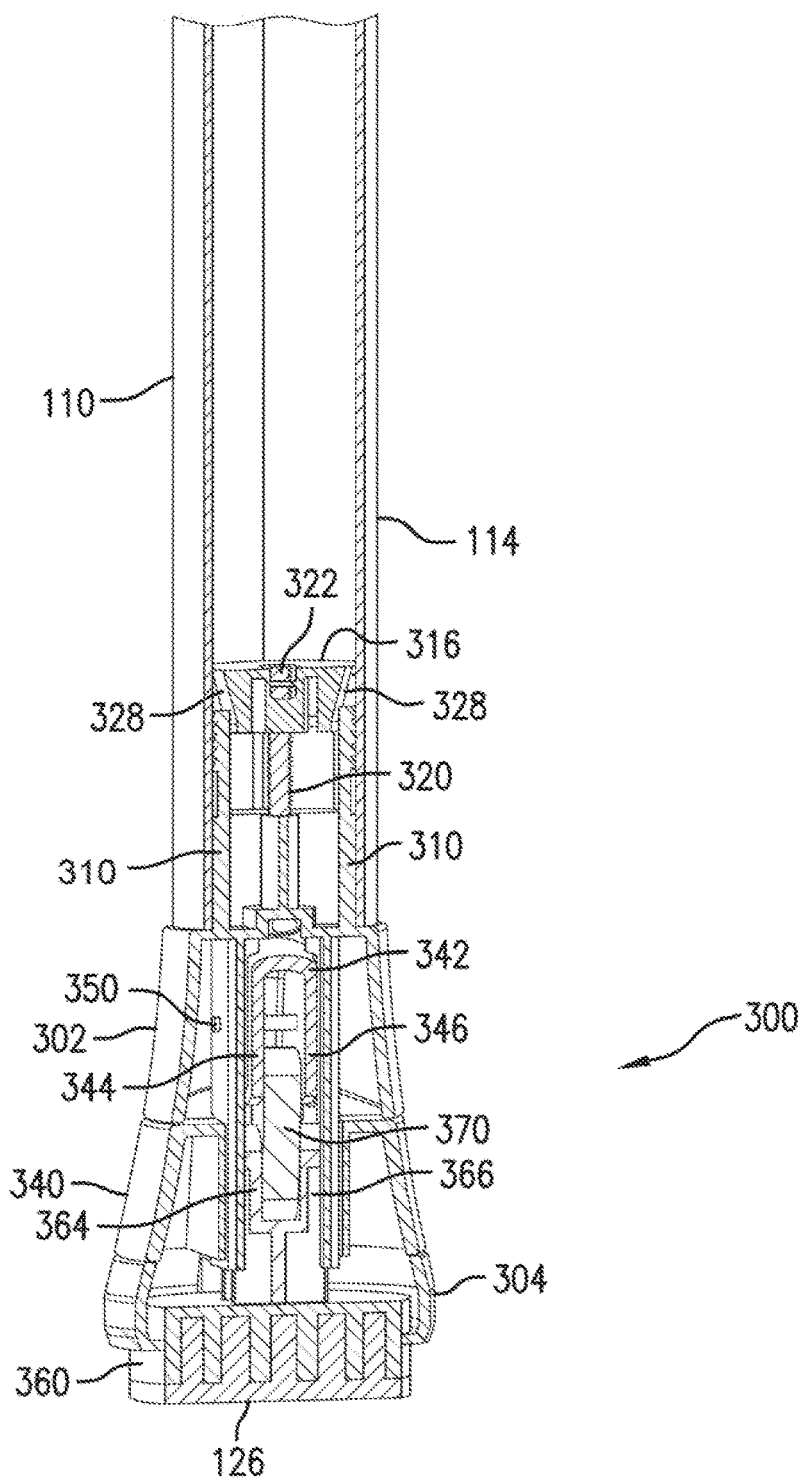
FIGS. 8 and 9 are cross-sectional views of the extension foot assembly of FIG. 6.
Figure 9:
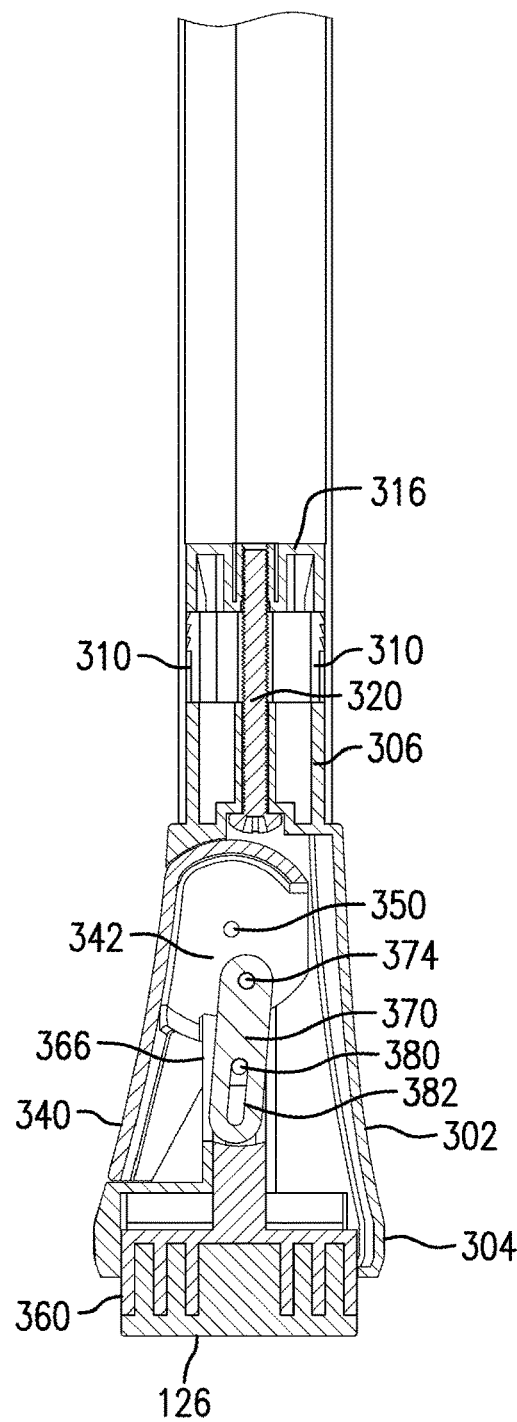
Figure 10:
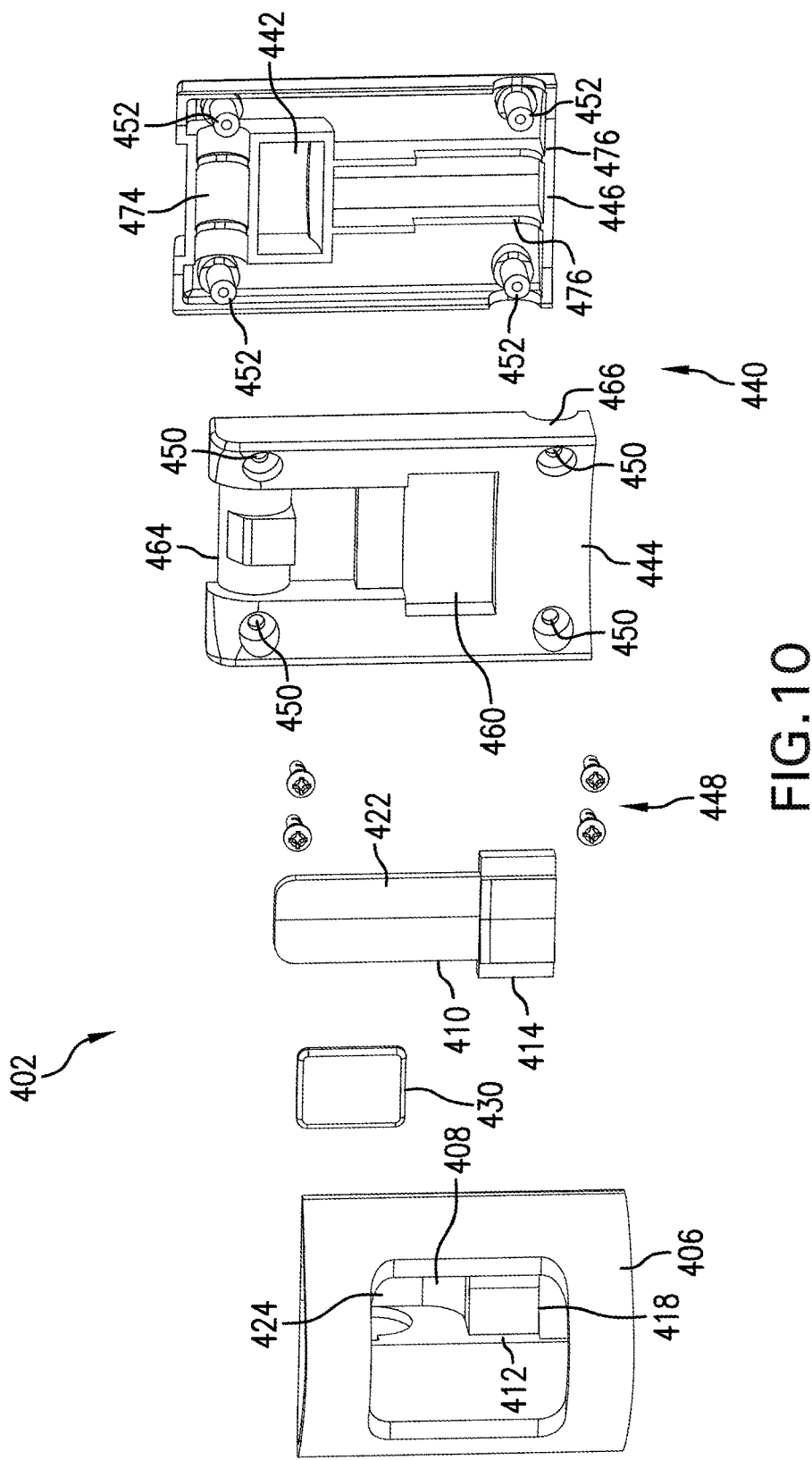
FIGS. 10 and 11 are exploded perspective views of an exemplary shelf support assembly for the tension-mounted pole caddy according to one aspect of the present disclosure.
Figure 11:
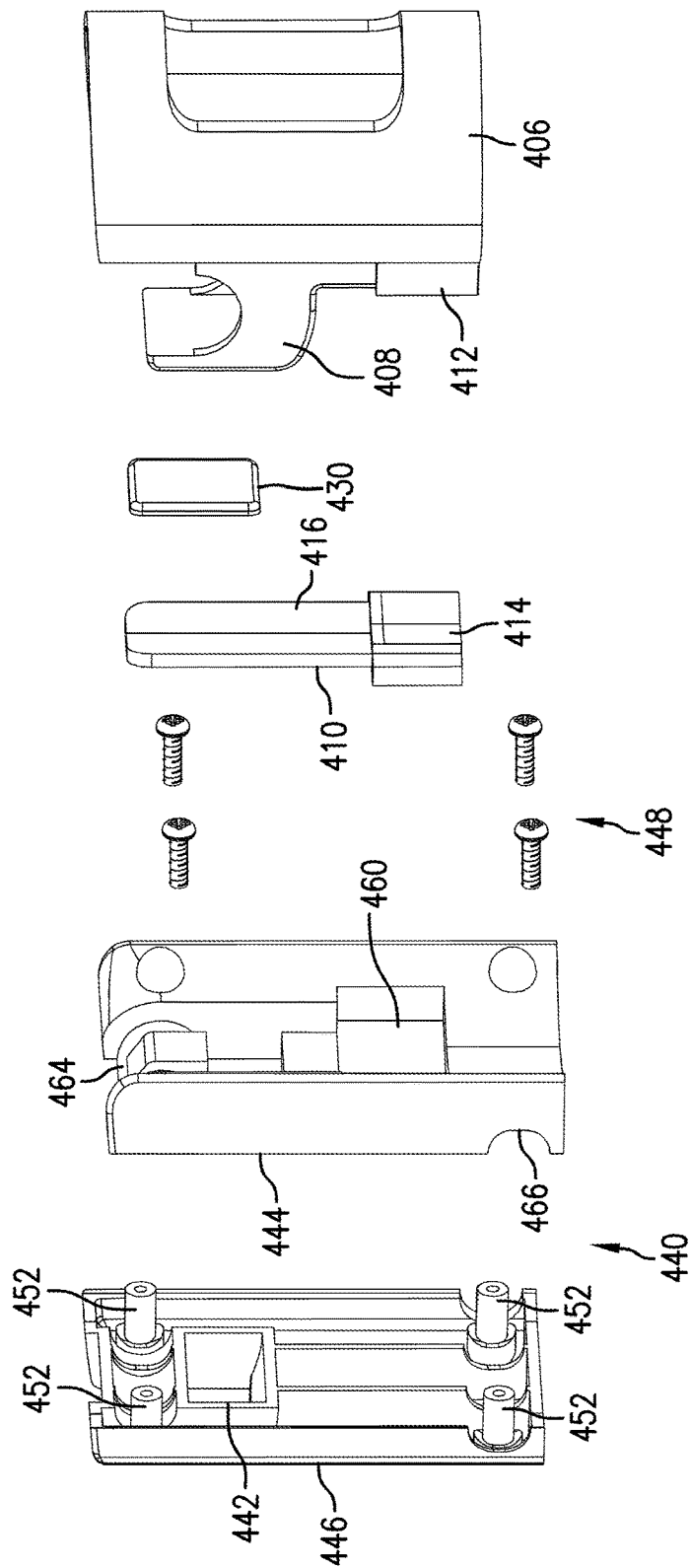

The exemplary extension mechanism 130 further includes a locking member 180 configured to move between engagement and disengagement with each of the first and second toothed racks 140, 142. In the depicted embodiment, the locking member 180 includes a first arm 182 having first teeth 184 and a second arm 186 spaced from the first arm and having second teeth 188. The first teeth and second teeth 184, 188 of the locking member 180 engage the first teeth 160, 170 of the respective first and second toothed racks 140, 142. A bridge 196 interconnects the first and second arms 182, 186. According to one aspect, the locking member 180 is pivotally mounted on the housing 132 via the bridge 196 and is biased into engagement with the first and second toothed racks 140, 142. As shown in FIGS. 4 and 5, the first housing part 136 of the housing 132 includes a recessed section 200 having a post 202 therein. The post 202 is provided with a cutout 204 dimensioned to receive the bridge 196, and when mounted in the cutout 204, the locking member 180 is connected to the first housing part 136 and pivots about an axis defined by the bridge 196. Located above the bridge 196 of the locking member 180 is a web 208 which spans between the first and second arms 182, 186. A projection 212 is provided on the web 208. A matching projection 214 is located in the recessed section 200 of the first housing part 136. A first biasing member (e.g., a first spring 218) is mounted on the projections 212, 214. The first spring 218 biases the first and second teeth 184, 188 of the locking member 180 into engagement with the first teeth 160, 170 of the first and second toothed racks 140, 142.

An actuator 230 is coupled to the locking member 180, and, as will be described below, manual actuation of the actuator 230 disengages the locking member 180 from each of the first and second toothed racks 140, 142. In the illustrated aspect, the actuator 230 is fitted within an opening 232 provided in the first housing part 136 via a support ring 238. The support ring 238 includes locking tabs 240 on its outer surface 242 which are received in corresponding cutouts 246 located at least partially about an inner surface 248 of the first housing part 136 defining the opening 232. The support ring 238 further includes guide channels 260 dimensioned to slidably receive corresponding guide tabs 262 provided on the actuator 230. It should be appreciated that each of the guide channels 260 has a closed end which limits the sliding movement of the actuator 230 outwardly of the housing 132. A rod 266 projects outwardly from the actuator 230 and extends through a hole 268 formed in the post 202. A second biasing member (e.g., a second spring 270) is mounted on the rod 266 and biases the actuator 230 away from the locking member 180. With continued reference to FIGS. 4 and 5, the second housing part 138 includes a post 276 having a stepped configuration which allows the post 276 to be at least partially positioned between the first and second toothed racks 140, 142. In the depicted embodiment, the post 276 includes a hole 278 dimensioned to receive an end of the rod 266, which in assembly secures the second spring 270 between the actuator 230 and the post 276. The post 276 further includes a cutout 280 and projecting outwardly from the cutout 280 is a rod 282. The pinion gear 178 is mounted on the rod 282 and is rotatably received in the cutout 280. This allows the pinion gear 178 to engage the second teeth 162, 172 of the first and second toothed racks 140, 142 that flank the post 276. As shown, an end of the rod 282 can be configured to engage the bridge 196 of the locking member 180, thereby further securing the locking member 180 in the housing 132.

In use, the locking member 180 is normally biased into engagement with the first teeth 160, 170 of the first and second toothed racks 140, 142 via the first spring 218. This prevents the movement of the first and second tubular bodies 110, 118 relative to the central tubular body 102. Manually depressing the actuator 230 pivots the locking member 180 out of engagement with the first and second toothed racks 140, 142. This allow the first and second tubular bodies 110, 118 to simultaneously move relative to the central tubular body 102 via the engagement of the pinion gear 178 with the second teeth 162, 172 of the first and second toothed racks 140, 142. When the actuator 230 is released, the second spring 270 biases the actuator 230 outwardly of the housing 132 and the first spring 218 causes the locking member 180 to again pivot back into engagement with the first and second toothed racks 140, 142 thereby maintaining the position of the first and second tubular bodies 110 relative to the central tubular body 102.

The exemplary pole caddy 100 further comprises an extension foot assembly 300 which provides fine tensioning on the pole caddy 100. With reference to FIGS. 6-9, the extension foot assembly 300 includes a housing 302 connected to the free second end 114 of the first tubular body 110. The housing 302 can have a flared open end portion 304 through which the padded surface member 126 is movably received, and a connecting end portion 306 having spaced connecting members 310 extending therefrom. Each of the connecting members 310 includes teeth 312 adapted to engage an inner surface of the first tubular body 110. To connect the housing 302 to the free second end 114, a wedge member 316 is loosely connected to the connecting end portion 306 via a fastener 320 which threadingly engages an insert 322 secured in a bore 324 of the wedge member 316. The wedge member 316 is provided with outwardly inclined surfaces 328, which engage inner surfaces of the connecting members 310, and with projections 330, which are positioned between the connecting members 310. The connecting end portion 306 together with the wedge member 316 is inserted in the first tubular body 110. The fastener 320 can then be tightened which draws the wedge member 316 axially toward the connecting end portion 306 causing the inclined surfaces 328 to press the teeth 312 of the connecting members 310 into engagement with the inner surface of the first tubular body 110.

The extension foot assembly 300 further comprises a lever 340 operably coupled to the padded surface member 126. As shown, the lever 340 includes an upper cam feature 342 having at least one cam defining a contact surface. According to one aspect, the cam feature 342 has spaced first and second cams 344, 346, each cam having a contact surface. The cam feature 342 is pivotally mounted to the housing 302 via a pivot pin 350 which extends through openings 352 in the cam feature 342 and corresponding openings 354 in the housing 302. It should be appreciated that the lever 340 is preferably configured to conform to the shape and contour of the flared open end portion 304 for aesthetic purposes. The padded surface member 126 is connected to a foot support 360 having a contact surface to be engaged by the cam feature contact surface. In the depicted embodiment, the foot support 360 includes a base 362 and a pair of spaced arm supports 364, 366 extending from the base 362, each of the arm supports including a contact surface. In use, the lever 340 is configured to move between a retracted position and an outward position wherein as the lever moves toward the outward position the lever contact surface engages the foot support contact surface to extend the foot support 360 (and the padded surface member 126 mounted to the base 362) outwardly from the housing 302. According to one aspect, the extension foot assembly 300 further includes a connecting member 370 interconnecting the lever 340 and the foot support 360 and configured to limit travel movement of the foot support 360 outwardly from the housing 302. The connecting member 370 can be in the form of a link which is fitted between the cams 344, 346 and the arm supports 364, 366. A first end portion of the connecting member 370 includes an opening 372 dimensioned to receive a pin 374 which also extends through openings 376 in the cam feature 342. A second end portion of the connecting member 370 includes an elongated slot 382. A pin 380 is positioned in the slot 382 and through openings 386 in the foot support 360. With this arrangement, rotation of the lever 340 moves the connecting member 370 axially toward the first tubular body 110 at the same time the lever contact surface is causing the foot support 360 to move outwardly of the housing 302. And the travel distance of the foot support 360 is dependent upon the length the elongated slot 382 of the connecting member 370.

Accessories, such as shelving 400 may be optionally attached along the length of the pole caddy 100. One embodiment of the pole caddy 100 is for use in a shower stall or the like to provide support space for items such as shampoos and conditioners, razors, soap, brushes and any other desired product. Accordingly, the featured shelves are specifically configured with hooks, slots, rails, and the like, to hold such products, as well as perforated bases to facilitate drainage of water (and other liquids). The illustrated shelving 400 include an exemplary shelf support assembly 402 mounted to the central tubular body 102. The shelf support assembly 402 includes a sleeve 406 dimensioned to be slid over the central tubular body 102, and a tongue member 410 mounted to the sleeve. The sleeve 406 includes a hook 408 for mounting the shelving. The tongue member 410 is fitted in a mounting section 412 of the sleeve 406 so that a base 414 of the tongue member 410 abuts against an inner ledge 418 defined by the mounting section 412 and an extension part 422 of the tongue member 410 is fitted in a sleeve opening 424. A compressible pad 430 (e.g., a silicone pad) can then be positioned between the central tubular body 102 and the extension part 422, and a silicone tape (not shown) can be adhered to the central tubular body 102 beneath the base 414. With this arrangement, the tongue member 410 is in frictional engagement with the central tubular body 102 to secure the sleeve 406 to the central tubular body. A shelf mount 440 is connected to the sleeve 406 via the hook 408 extending through an opening 442 defined in the shelf mount 440. As shown, the shelf mount 440 can be a two part structure having a first mount part 444 and a second mount part 446 fastened to the first sleeve part via fasteners 448 which extend through openings 450 in the first mount part 444 and threadingly engage bosses 452 on the second mount part 446. The first mount part 444 includes a recessed section 460 sized to receive the mounting section 412 of the sleeve 406, and upper and lower wire shelf receiving features 464, 466. The second mount part 446 includes corresponding upper and lower wire shelf receiving features 474, 476. In use, the shelving 400 is first attached to the shelf mount 440 and then this assembly is connected to the sleeve hook 408. It should be appreciated that the sleeve 406 can be a molded plastic or coated to avoid marring the outer surface of the central tubular body 102.

Figure 12:
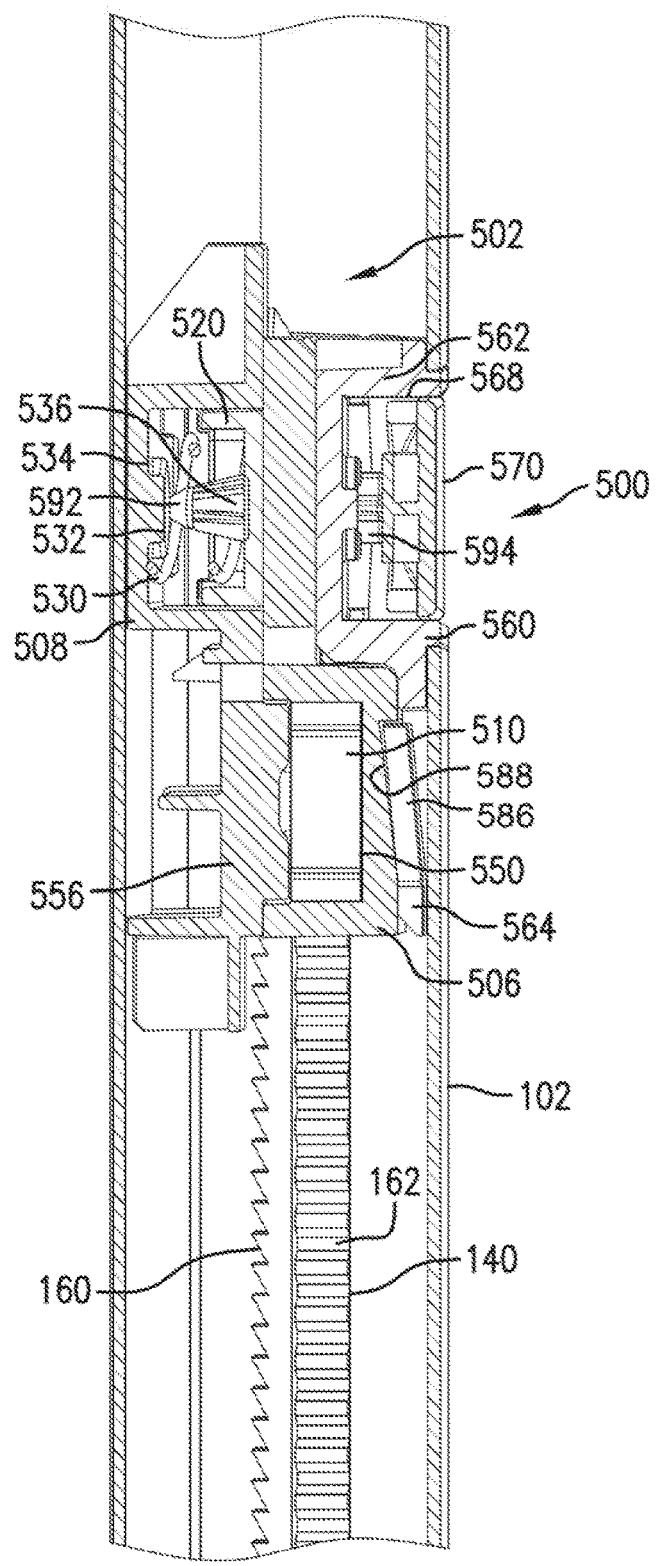
FIG. 12 is a cross-sectional view of an exemplary extension mechanism according to another aspect of the present disclosure.
Figure 13:
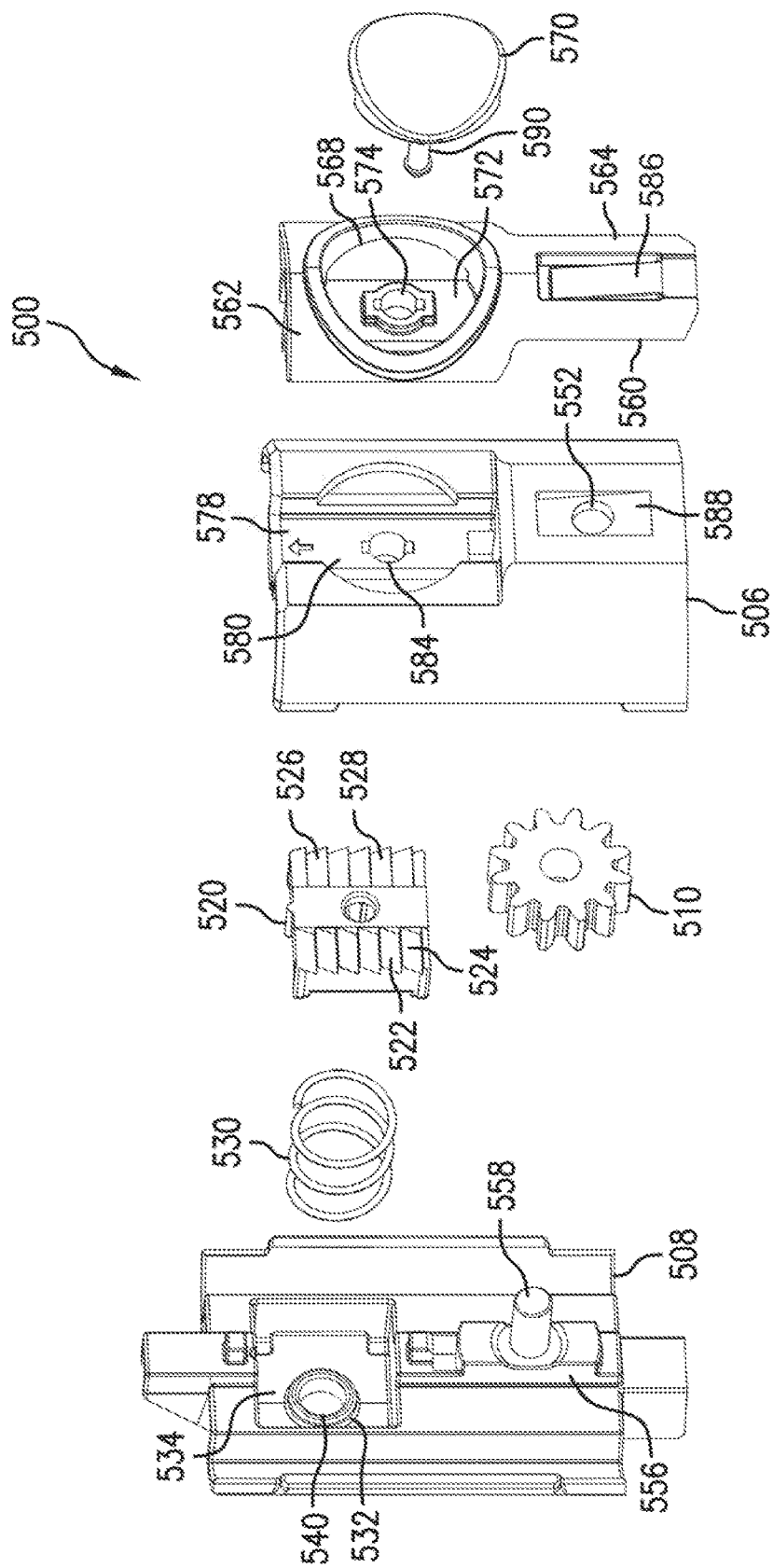
FIGS. 13 and 14 are exploded perspective views of the extension mechanism of FIG. 12.
Figure 14:
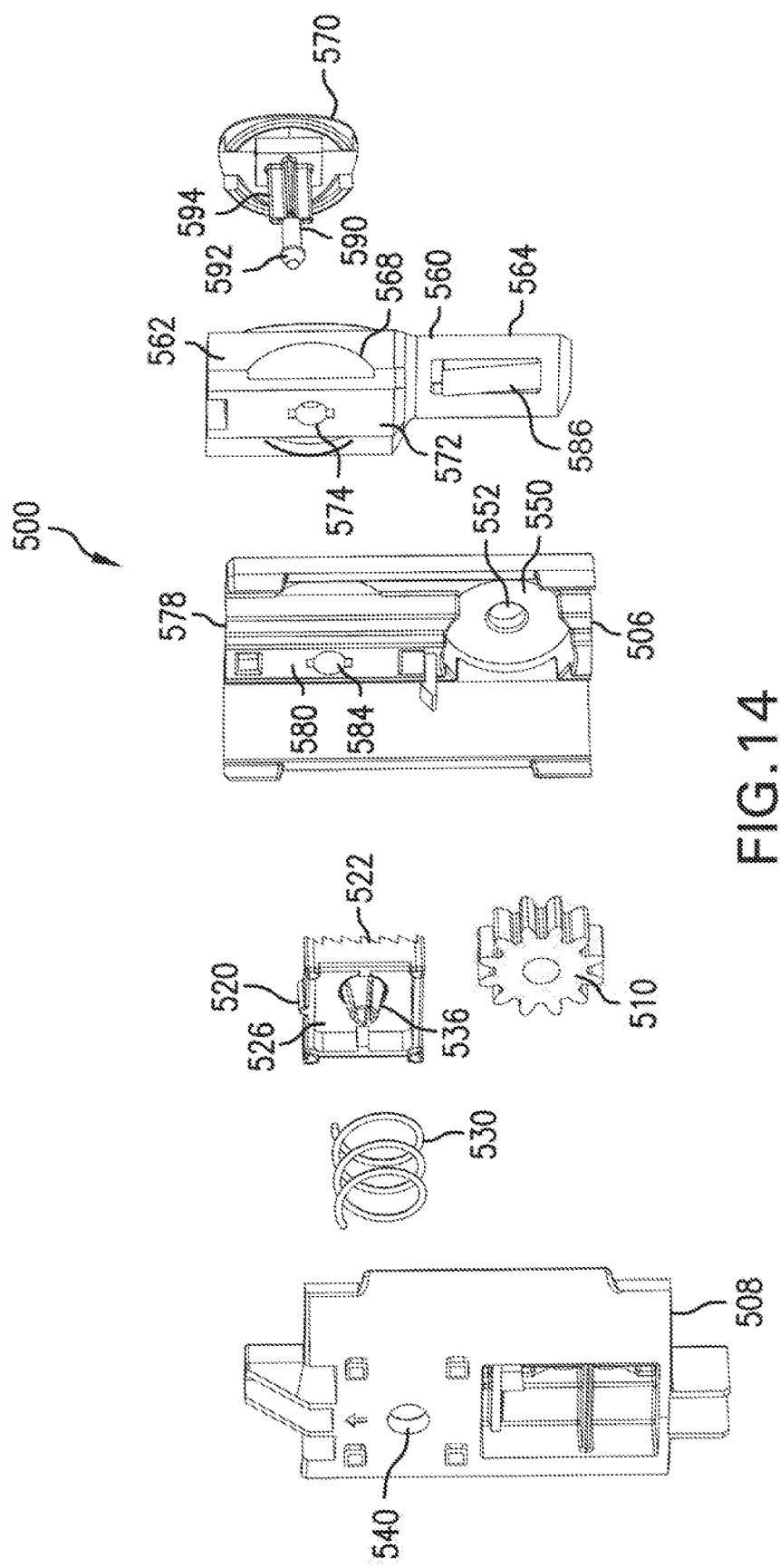
Figure 15:
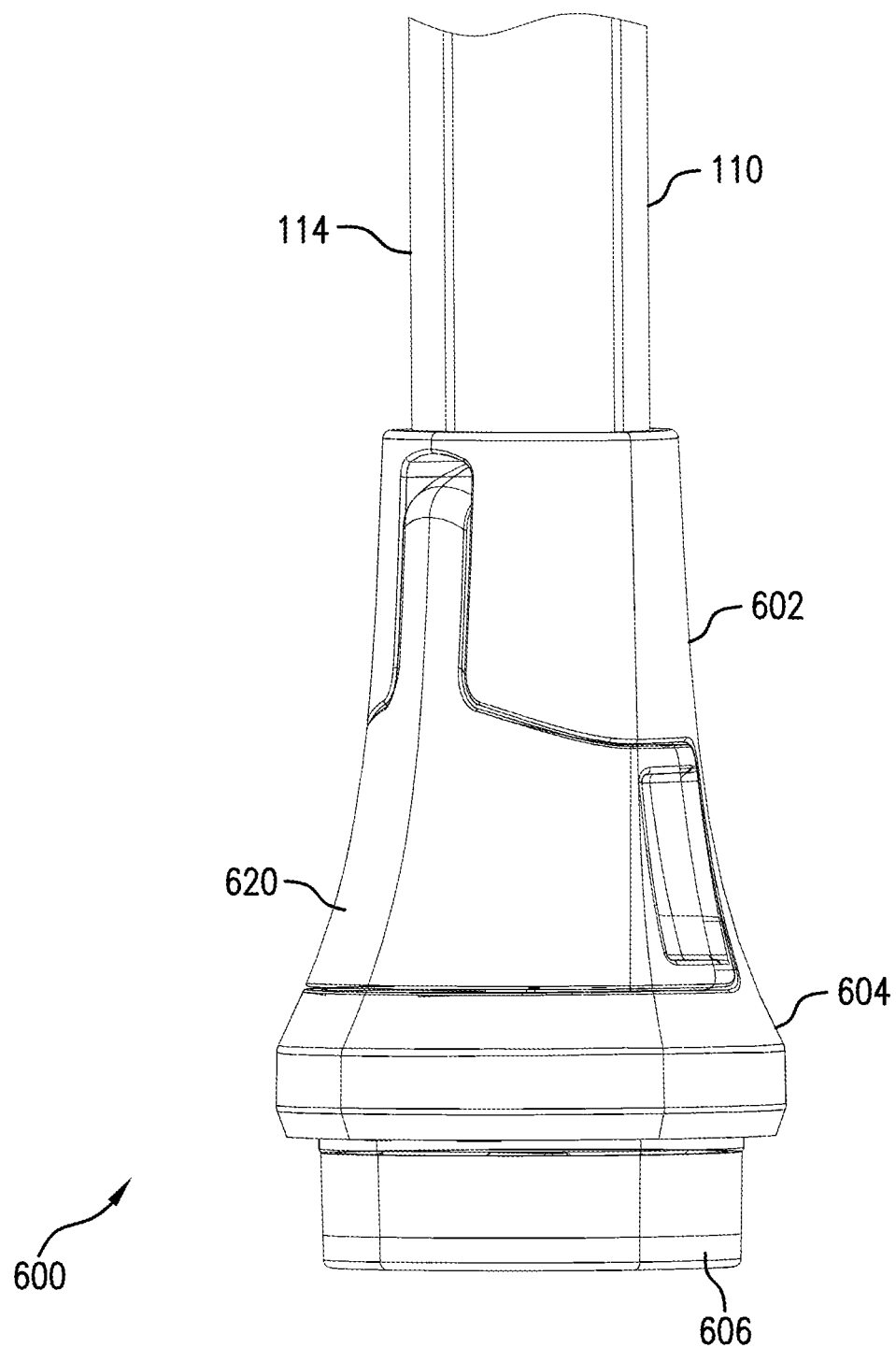
FIG. 15 is an enlarged perspective view of an exemplary extension foot assembly for the tension-mounted pole caddy according to another aspect of the present disclosure.
Figure 16:
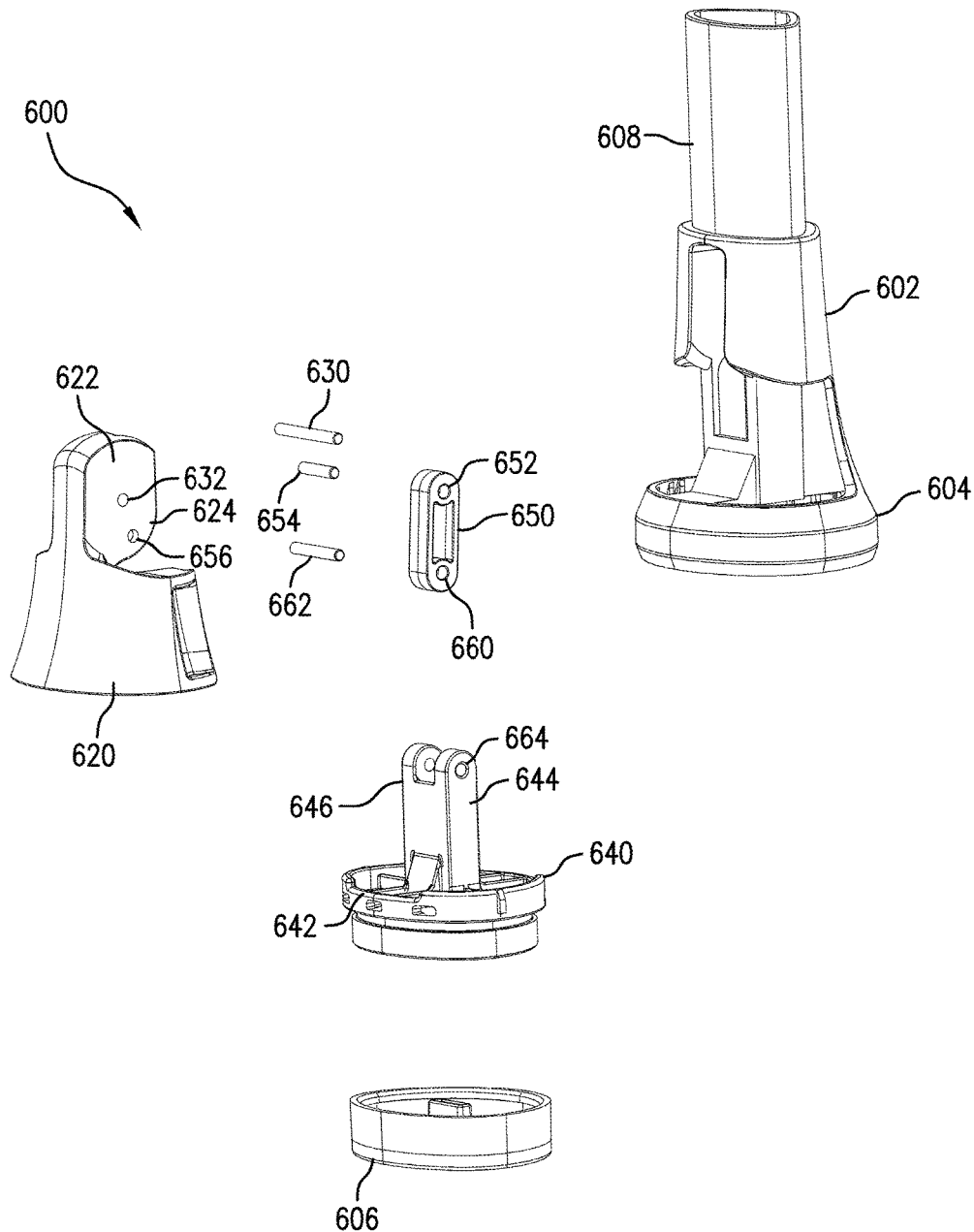
FIG. 16 is an exploded perspective view of the extension foot assembly of FIG. 16.
Figure 17:
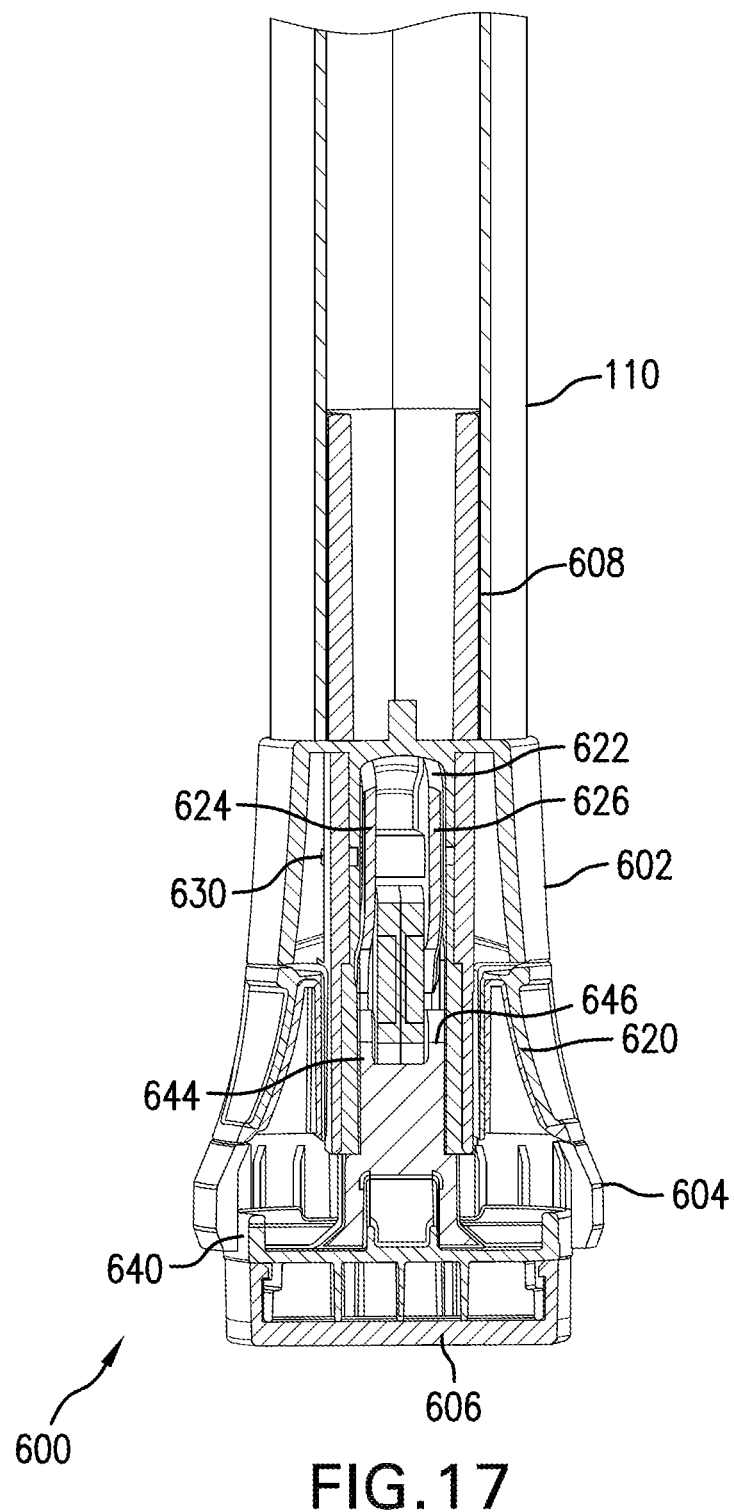
FIGS. 17 and 18 are cross-sectional views of the extension foot assembly of FIG. 15.
Figure 18:
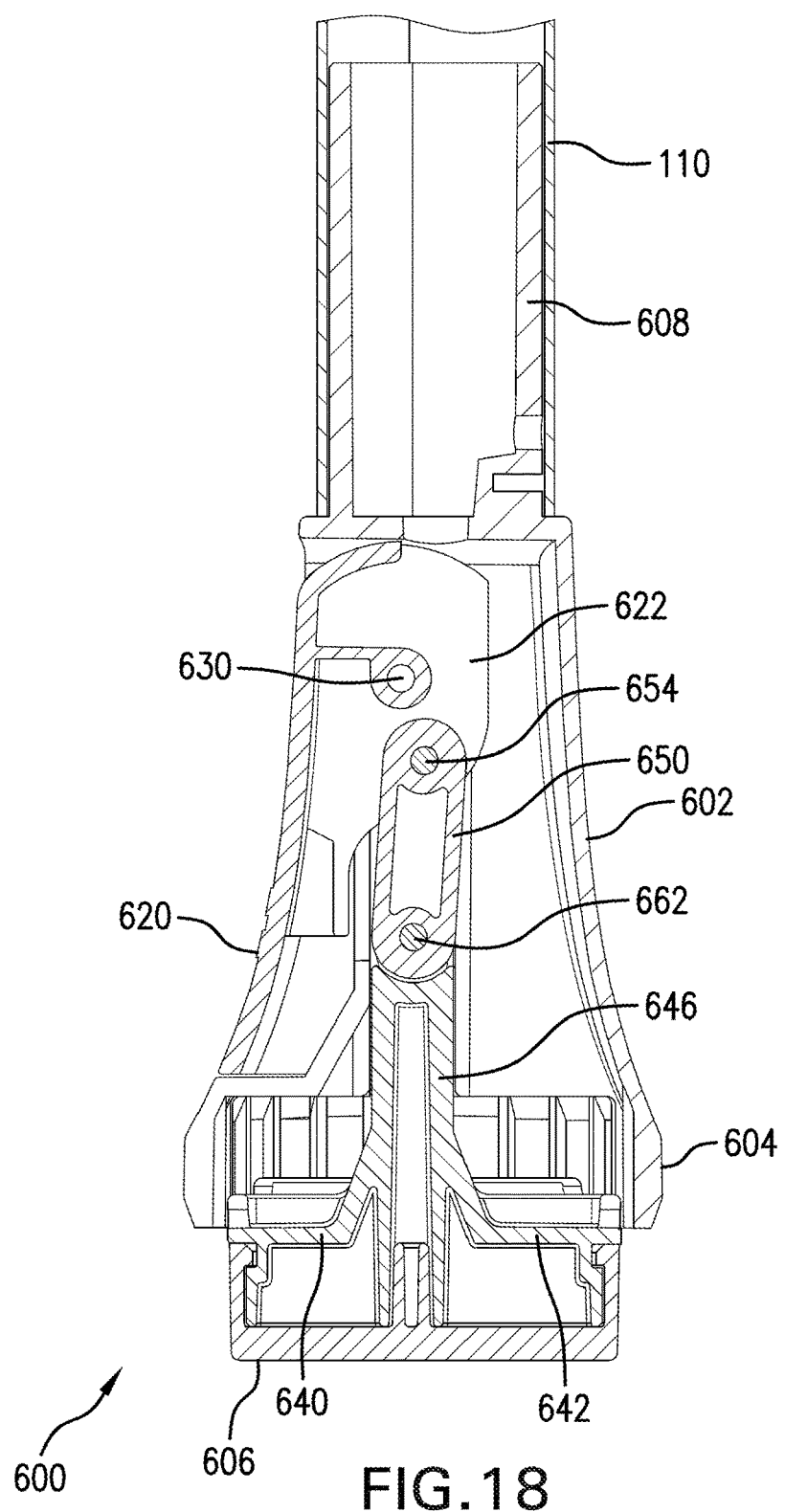

FIGS. 12-14 depict another aspect of an extension mechanism 500 mounted to the central tubular body 102 for adjusting and locking the span of the pole caddy 100. Similar to the extension mechanism 130, the extension mechanism 500 is configured to be manually actuated and has a toothed rack and pinion arrangement configured to simultaneously move the first and second tubular bodies 110, 118 relative to the central tubular body 102. The extension mechanism 500 includes a housing 502 mounted at least partially within the central tubular body 102. The housing 502 can be defined by a first housing part 506 and a second housing part 508 and is at least partially fitted over the first toothed rack 140 and the second toothed rack 142. A pinion gear 510 is in engagement with each of the first and second toothed racks 140, 142, and more particularly, in engagement with the second teeth 162, 172 of each of the first and second toothed racks 140, 142.

A locking member 520 of the extension mechanism 500 is configured to move between engagement and disengagement with each of the first and second toothed racks 140, 142. In the depicted embodiment, the locking member 520 includes a first section 522 having first teeth 524 and a second section 526 spaced from the first section and having second teeth 528. The first and second teeth 524, 528 of the locking member 520 engage the first teeth 160, 170 of the respective first and second toothed racks 140, 142. According to one aspect, the locking member 520 is biased into engagement with the first and second toothed racks 140, 142, for example, in a direction perpendicular to a length of each first and second toothed rack 140, 142 via a biasing member 530 (e.g., a spring). The spring 530 is mounted on or around a projection 532 located in a recessed section 534 on the second housing part 508 and on or around a matching projection 536 on the locking member 520. The spring 530 normally biases the first and second teeth 524, 528 of the locking member 520 into engagement with the first teeth 160, 170 of the first and second toothed racks 140, 142. The recessed section 534 is dimensioned to receive the locking member 520 when moved out of engagement with the first and second toothed racks 140, 142. Further depicted is an opening 540 located in the projection 532 which extends through the second housing part 508. As the locking member 520 is moved into the recessed section 534 the projection 536 of the locking member 520 can be at least partially received in the opening 540.

As shown, the first housing part 506 of the housing 502 includes a recessed section 550 having an opening 552 therethrough. The second housing part 508 includes a post 556 having a stepped configuration which allows the post 556 to be at least partially positioned between the first and second toothed racks 140, 142. A rod 558 projects from the post 556 of second housing part 508. The pinion gear 510 is mounted on the rod 558 and is rotatably received in the recessed section 550, with an end of the rod 558 at least partially received in the opening 552. This allows the pinion gear 510 to engage the second teeth 162, 172 of the first and second toothed racks 140, 142 that flank the post 556. As shown, the end of the rod 558 can be configured to engage part of an actuator support 560 mounted to the first housing part 506.

The actuator support 560 includes a first section 562 and a second section 564 depending from the first section. The first section 562 includes an opening 568 dimensioned to receive an actuator 570. A post 572 bisects the opening 568 and has an opening 574 extending therethrough. The post 572 is received in a corresponding channel 578 provided on the first housing part 506. A wall 580 of the first housing part 506 that at least partially defines the channel 578 includes an opening 584 which, when the actuator support 560 is properly mounted to the first housing part 506, is axially aligned with the opening 574. In the depicted aspect, the second section 564 of the actuator support 560 includes a canted portion or locking tab 586 which, in the depicted embodiment, is received in another recessed portion 588 located on the first housing part 506. The end of the rod 558 engages the canted portion 586.

The actuator 570 is coupled to the locking member 520, and similar to the above described embodiment, manual actuation of the actuator 570 disengages the locking member 520 from each of the first and second toothed racks 140, 142. In the illustrated aspect, the actuator 570 is fitted within the opening 568 provided in the actuator support 560. The actuator 570 includes a rod 590 projecting outwardly therefrom. The rod 590 includes an enlarged head 592 at its distal end and at least one guide 594. In the depicted aspect, a pair of guides 594 are located on the rod 590, which can be diametrically spaced on the rod 590. The rod 590 extends through the openings 574, 584 of the respective actuator support 560 and first housing part 506, with the head 592 of the rod secured in the projection 536 of the locking member 520 and the guides 594 abutted against the locking member 520. Therefore, the locking member 520 is fixed to the rod 590 of the actuator 570. It should be appreciated that the openings 574, 584 are configured to slidingly receive the guides 594.

In use, the locking member 520 is normally biased into engagement with the first teeth 160, 170 of the first and second toothed racks 140, 142 via the spring 530. This prevents the movement of the first and second tubular bodies 110, 118 relative to the central tubular body 102. Manually depressing the actuator 570 moves the locking member 520 out of engagement with the first and second toothed racks 140, 142 and into the recessed section 534 of the second housing part 508. This allow the first and second tubular bodies 110, 118 to simultaneously move relative to the central tubular body 102 via the engagement of the pinion gear 510 with the second teeth 162, 172 of the first and second toothed racks 140, 142. When the actuator 570 is released, the spring 530 causes the locking member 520 to again move back into engagement with the first and second toothed racks 140, 142 thereby maintaining the position of the first and second tubular bodies 110 relative to the central tubular body 102.

FIGS. 15-18 depict an extension foot assembly 600 according to another aspect of the present disclosure which provides fine tensioning on the pole caddy 100. Similar to the extension foot assembly 300, the extension foot assembly 600 includes a housing 602 connected to the free second end 114 of the first tubular body 110. The housing 602 can have a flared open end portion 604 through which a padded surface member 606 is movably received, and a connecting end portion 608 adapted to engage an inner surface of the first tubular body 110. By way of example, crush ribs can be located on the connecting end portion 608 which at least partially deform upon insertion of the connecting end portion 608 in the first tubular body 110. It should be appreciated that the use of the crush ribs can ensure a fixed connection with the first tubular body 110.

The extension foot assembly 600 further comprises a lever 620 operably coupled to the padded surface member 606. As shown, the lever 620 includes an upper cam feature 622 having at least one cam defining a contact surface. According to one aspect, the cam feature 622 has spaced first and second cams 624, 626, each cam having a contact surface. The cam feature 622 is pivotally mounted to the housing 602 via a pivot pin 630 which extends through openings 632 in the cam feature 622 and corresponding openings (not shown) in the housing 602. The lever 620 is preferably configured to conform to the shape and contour of the flared open end portion 604 for aesthetic purposes. The padded surface member 606 is connected to a foot support 640 having a contact surface to be engaged by the cam feature contact surface. In the depicted embodiment, the foot support 640 includes a base 642 and a pair of spaced arm supports 644, 646 extending from the base 642, each of the arm supports including a contact surface. In use, the lever 620 is configured to move between a retracted position and an outward position wherein as the lever moves toward the outward position the lever contact surface engages the foot support contact surface to extend the foot support 640 (and the padded surface member 606 mounted to the base 642) outwardly from the housing 602. According to one aspect, the extension foot assembly 600 further includes a connecting member 650 interconnecting the lever 620 and the foot support 640 and configured to limit travel movement of the foot support 640 outwardly from the housing 602. The connecting member 650 can be in the form of a link which is fitted between the cams 624, 626 and the arm supports 644, 646. A first end portion of the connecting member 650 includes an opening 652 dimensioned to receive a pin 654 which also extends through openings 656 in the cam feature 622. A second end portion of the connecting member 650 includes an opening 660. A pin 662 is positioned in the opening 660 and through openings 664 in the foot support 640. With this arrangement, rotation of the lever 620 moves the connecting member 650 axially toward the first tubular body 110 at the same time the lever contact surface is causing the foot support 640 to move outwardly of the housing 602. And the travel distance of the foot support 640 is restricted by the connecting member 650.

Figure 19:
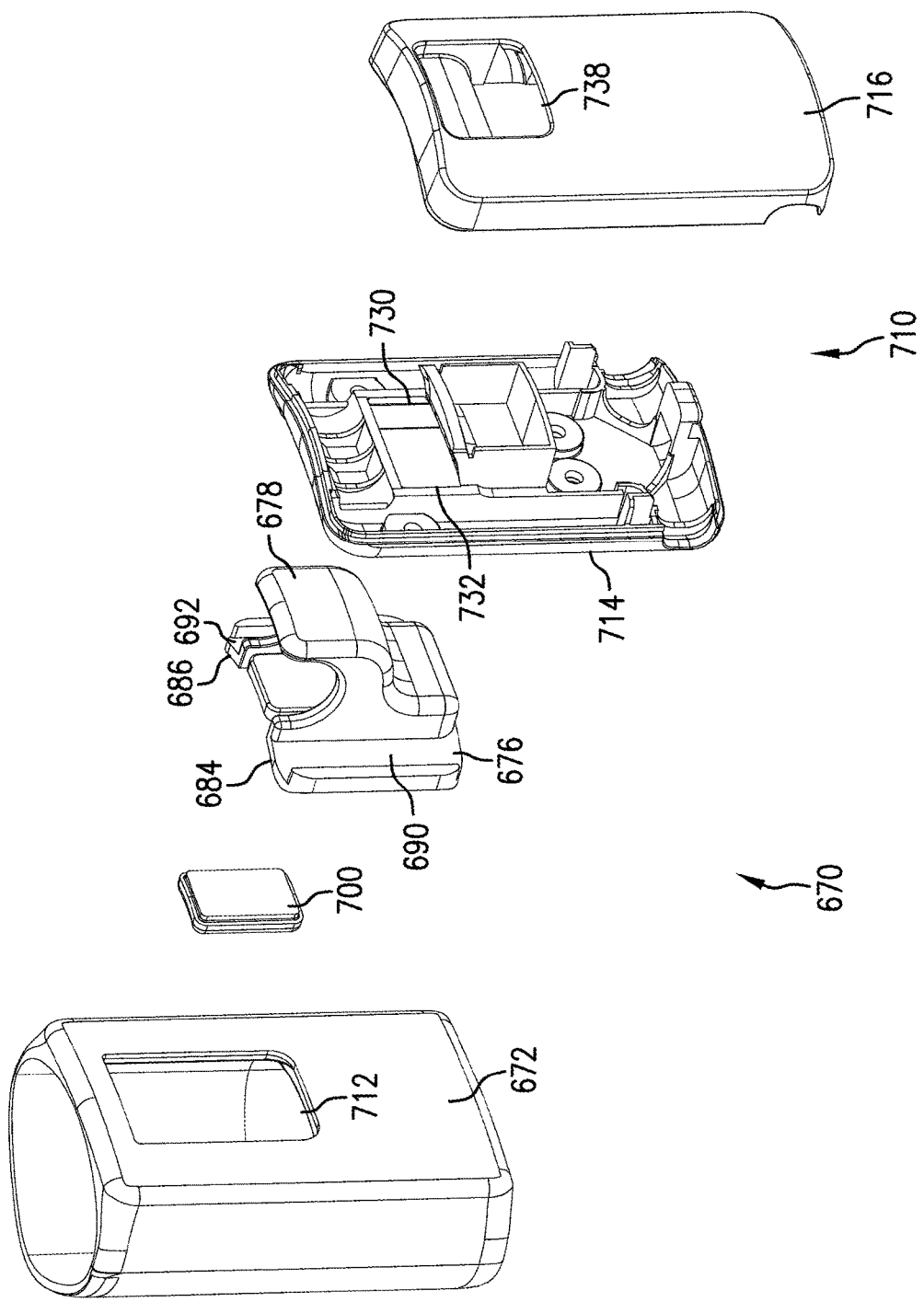
FIGS. 19 and 20 are exploded perspective views of an exemplary shelf support assembly for the tension-mounted pole caddy according to another aspect of the present disclosure.
Figure 20:
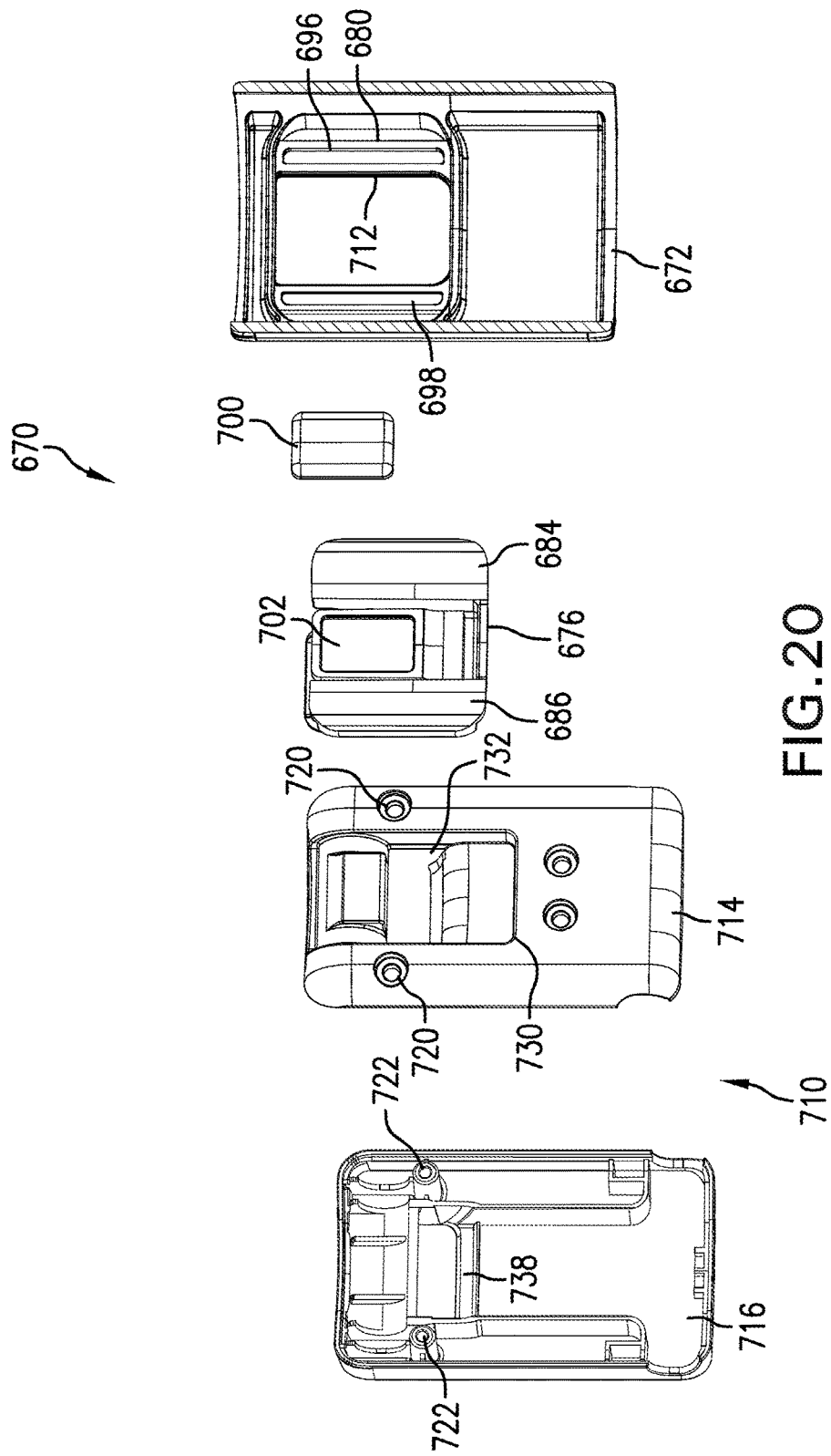
Figure 21:
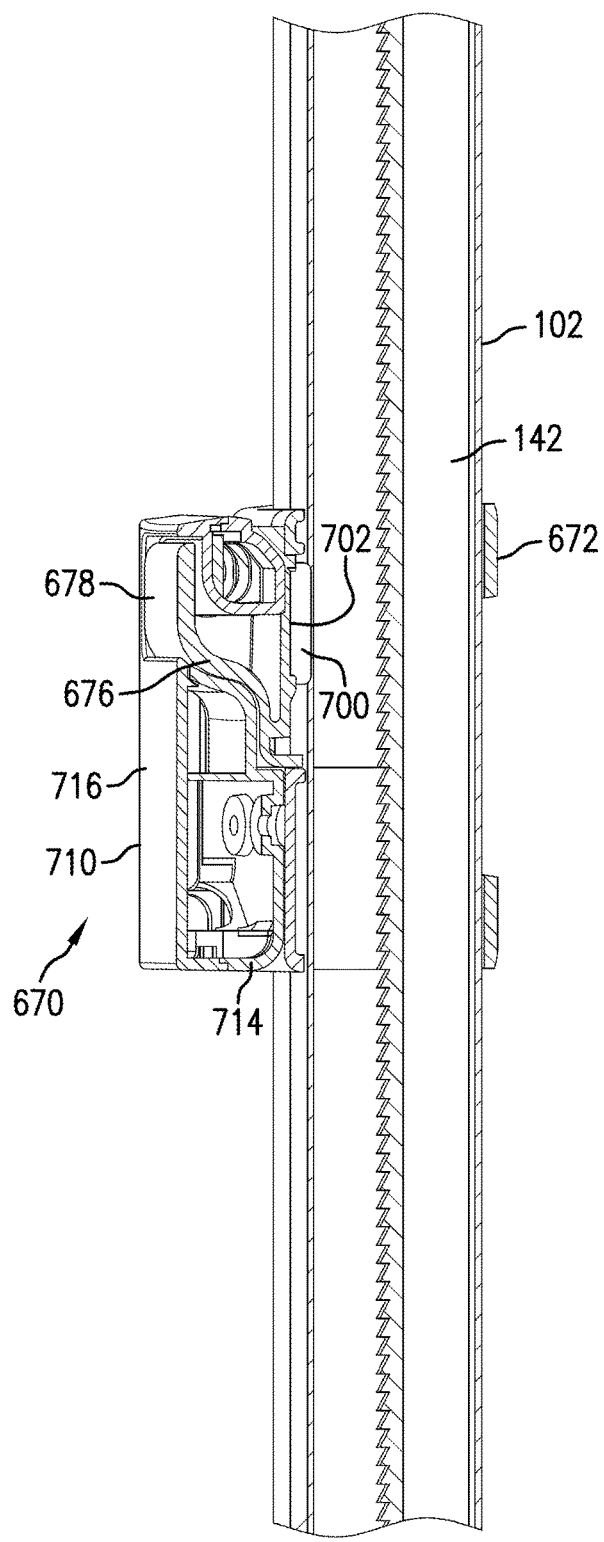
FIG. 21 is a cross-sectional view of the shelf support assembly of FIG. 19 mounted to the tension-mounted pole caddy.

FIGS. 19-21 illustrate an exemplary shelf support assembly 670 according to another aspect of the present disclosure which is mounted to the central tubular body 102. The shelf support assembly 670 includes a sleeve 672 dimensioned to be slid over the central tubular body 102, and a hook member 676 mounted to the sleeve having a hook 678 for mounting the shelving. The hook member 676 is fitted in a mounting section 680 of the sleeve 672 in a manner allowing first and second engaging portions 684, 686 of the hook member 676 to engage the central tubular body 102. In the depicted aspect, the first and second engaging portions 684, 686 of the hook member 676 at least partially define first and second channels 690, 692. The first and second channels 690, 692 are adapted to receive first and second elongated guides 696, 698 located on the mounting section 680. A compressible pad 700 (e.g., a silicone pad) can be positioned between the central tubular body 102 and hook member 676, and the hook member 676 can include a seat 702 sized to receive the compressible pad 700. With this arrangement, the hook member 676 is in frictional engagement with the central tubular body 102 to secure the sleeve 672 to the central tubular body. A shelf mount 710 is connected to the sleeve 672 via the hook 678 extending through an opening 712 defined in the sleeve 672. As shown, similar to the shelf mount 440, the shelf mount 710 can be a two part structure having a first mount part 714 and a second mount part 716 fastened to the first mount part via fasteners which extend through openings 720 in the first mount part 714 and threadingly engage bosses 722 on the second mount part 716. The first mount part 714 includes a recessed section 730 sized to receive a portion of the hook 678, with the hook 678 received through a cutout 732 in the recessed section. The second mount part 716 also includes a cutout 738 for the hook 678. The shelf mount 710 further has upper and lower wire shelf receiving features. In use, the shelving 400 can be first attached to the shelf mount 710 and then this assembly can be connected to the hook 678 of the hook member 676. It should be appreciated that the sleeve 672 can be a molded plastic or coated to avoid marring the outer surface of the central tubular body 102.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A tension-mounted pole for mounting between two substantially parallel surfaces, the pole comprising:
   a central tubular body;
   a first telescoping tubular body having a telescoping first end coupled with the central tubular body and a free second end;
   a second tubular body having a telescoping first end coupled with the central tubular body and a free second end; and
   an extension mechanism mounted to the central tubular body, the extension mechanism configured to be manually actuated and having a toothed rack and pinion arrangement configured to simultaneously move the first and second tubular bodies in opposite directions relative to the central tubular body,
   wherein the extension mechanism includes:
   a first toothed rack, a second toothed rack, and a pinion gear engaged with the first and second toothed racks, and
   a locking member configured to move between engagement with the first and second toothed racks and disengagement from the first and second toothed racks,
   wherein the locking member includes a first section having first teeth engaging the first toothed rack and a second section spaced from the first section and having second teeth engaging the second toothed rack,
   wherein the pinion gear and the locking member respectively engage portions of the first and second toothed racks that differ in orientation.

2. The tension-mounted pole of claim 1, wherein the extension mechanism includes:
   the first toothed rack provided within the central tubular body and having a first end section and a second end section, the second end section is connected to the telescoping first end of the first tubular body, and
   the second toothed rack provided within the central tubular body and having a first end section and a second end section, the second end section is connected to the telescoping first end of the second tubular body.

3. The tension-mounted pole of claim 2, wherein the extension mechanism includes
an actuator coupled to the locking member, wherein manual actuation of the actuator disengages the locking member from the first and second toothed racks.

4. The tension mounted pole of claim 3, wherein the actuator includes a rod projecting outwardly therefrom, and the locking member is fixed to the rod of the actuator.

5. The tension-mounted pole of claim 3, wherein the locking member is biased into engagement with the first and second toothed racks in a direction perpendicular to a length of each first and second toothed rack.

6. The tension-mounted pole of claim 1, wherein the first toothed rack includes first teeth and second teeth separated from the first teeth by a first separating wall of the first toothed rack extending along a longitudinal extent of the first toothed rack, the first and second teeth located on opposite sides of the first separating wall, and the locking member engaging the first teeth and the pinion engaging the second teeth.

7. The tension-mounted pole of claim 6, wherein the second toothed rack includes first teeth and second teeth separated from the first teeth by a second separating wall of the second toothed rack extending along a longitudinal extent of the second toothed rack, the first and second teeth located on opposite sides of the second separating wall, and the locking member engaging the first teeth and the pinion engaging the second teeth.

8. The tension-mounted pole of claim 1, comprising an extension foot assembly including:
a housing connected to the free second end of the first tubular body,
a lever movably mounted to the housing, and
a foot mounted to the housing and connected to the lever,
wherein the lever is configured to move between a retracted position and an outward position wherein as the lever is moved toward the outward position the foot is configured to extend outwardly from the housing.

9. The tension-mounted pole of claim 8, wherein the extension foot assembly further includes a connecting member interconnecting the lever and the foot and configured to limit movement of the foot outwardly from the housing.

10. The tension-mounted pole of claim 9, wherein the lever includes a pair of cams and the foot includes a pair of spaced supports, the cams configured to engage the supports as the lever is moved toward the outward position, the connecting member mounted between the pair of cams and the pair of supports.

11. The tension-mounted pole of claim 1, including a shelf support assembly mounted to the central tubular body, the shelf support assembly including:
a sleeve dimensioned to be slid over the central tubular body, and
a hook member mounted to the sleeve, the hook member in frictional engagement with the central tubular body to secure the sleeve to the central tubular body.

12. The tension-mounted pole of claim 11, wherein the hook member includes a recess for mounting of a compressible pad for frictional engagement with the central tubular body.

13. A tension-mounted pole for mounting between two substantially parallel surfaces, the tension-mounted pole comprising:
a central tubular body;
a first telescoping tubular body having a telescoping first end coupled with the central tubular body and a free second end;
a second tubular body having a telescoping first end coupled with the central tubular body and a free second end; and
a manually actuated extension mechanism mounted to the central tubular body, the extension mechanism includes:
a first toothed rack provided within the central tubular body and having a first end section and a second end section, the second end section is connected to the telescoping first end of the first tubular body,
a second toothed rack provided within the central tubular body and having a first end section and a second end section, the second end section is connected to the telescoping first end of the second tubular body, and
a pinion gear in engagement with the first and second toothed racks, the pinion gear allows for simultaneous movement of the first and second tubular bodies in opposite directions relative to the central tubular body, and
a locking member biased into simultaneous engagement with each of the first and second toothed racks,
wherein the first toothed rack includes first teeth and second teeth separated from the first teeth by a first separating wall of the first toothed rack, the locking member engaging the first teeth and the pinion engaging the second teeth,
wherein the second toothed rack includes first teeth and second teeth separated from the first teeth by a second separating wall of the second toothed rack, the locking member engaging the first teeth and the pinion engaging the second teeth.

14. The tension-mounted pole of claim 13, wherein the extension mechanism includes
an actuator coupled to the locking member, wherein manual actuation of the actuator simultaneously disengages the locking member from each of the first and second toothed racks.

15. The tension-mounted pole of claim 13, comprising an extension foot assembly including:
a housing connected to the free second end of the first tubular body,
a lever mounted to the housing,
a foot mounted to the housing, and
a connecting member interconnecting the lever and the foot and configured to limit movement of the foot relative to the housing,
wherein the lever is configured to move between a retracted position and an outward position wherein as the lever moves toward the outward position the foot is configured to extend outwardly from the housing.

16. The tension-mounted pole of claim 13, wherein the first and second teeth of the first toothed rack are located on opposite sides of the first separating wall, and the first and second teeth of the second tooth rack are located on opposite sides of the second separating wall.

* * * * *